United States Patent
Donovan et al.

(10) Patent No.: US 12,038,509 B2
(45) Date of Patent: Jul. 16, 2024

(54) SOLID-STATE LIDAR TRANSMITTER WITH LASER CONTROL

(71) Applicant: Opsys Tech Ltd., Holon (IL)

(72) Inventors: Mark J. Donovan, Mountain View, CA (US); Raphael Harel, Beer Yaakov (IL); Noam Tziony, Petah Tikva (IL); Mordehai Caspi, Rishon Leziyyon (IL); Meir Fogel, Rehovot (IL)

(73) Assignee: Opsys Tech Lid., Holon (IL)

( * ) Notice: Subject to any disclaimer, the term of this patent is extended or adjusted under 35 U.S.C. 154(b) by 0 days.

(21) Appl. No.: 18/353,091

(22) Filed: Jul. 16, 2023

(65) Prior Publication Data
US 2023/0358887 A1 Nov. 9, 2023

Related U.S. Application Data

(63) Continuation of application No. 16/841,930, filed on Apr. 7, 2020.
(Continued)

(51) Int. Cl.
| | |
|---|---|
| *G01S 17/88* | (2006.01) |
| *G01S 7/484* | (2006.01) |
| *G01S 7/486* | (2020.01) |

(52) U.S. Cl.
CPC .............. *G01S 17/88* (2013.01); *G01S 7/484* (2013.01); *G01S 7/486* (2013.01)

(58) Field of Classification Search
CPC .......... G01S 17/88; G01S 7/484; G01S 7/486; G01S 7/4815; G01S 17/93; G05D 1/024
See application file for complete search history.

(56) References Cited

U.S. PATENT DOCUMENTS

| | | |
|---|---|---|
| 6,246,708 B1 | 6/2001 | Thornton et al. |
| 6,717,972 B2 | 4/2004 | Steinle et al. |

(Continued)

FOREIGN PATENT DOCUMENTS

| | | |
|---|---|---|
| CN | 113692540 A | 11/2021 |
| EP | 1444696 B1 | 3/2005 |

(Continued)

OTHER PUBLICATIONS

Plant, et al., "256-Channel Bidirectional Optical Interconnect Using VCSELs and Photodiodes on CMOS", Journal of Lightwave Technology, vol. 19, No. 8, Aug. 2001, pp. 1093-1103.
(Continued)

*Primary Examiner* — James C. Jones
(74) *Attorney, Agent, or Firm* — Rauschenbach Patent Law Group, PLLC; Kurt Rauschenbach

(57) ABSTRACT

A solid state LIDAR transmitter includes a two dimensional array of laser devices having columns and rows and configured such that anodes of laser devices in a column are connected to a common anode connection and cathodes of laser devices in a row are connected to a common cathode connection. A capacitive discharge circuit comprises a first switch configured so the capacitive discharge circuit charges to a voltage potential when the first switch is open and discharges when the first switch is closed. A second switch is configured such that the common cathode connection is coupled to ground when the second switch is closed. A controller is configured to instruct the first switch and the second switch to close at a time $t_0$ such that the capacitive discharge circuit charges to the voltage potential at a time, $t_1$, thereby causing a laser device connected between the capacitive discharge circuit and the second switch to generate an optical pulse.

18 Claims, 20 Drawing Sheets

Related U.S. Application Data

(60) Provisional application No. 62/831,668, filed on Apr. 9, 2019.

(56) References Cited

U.S. PATENT DOCUMENTS

| | | | |
|---|---|---|---|
| 7,702,191 | B1 | 4/2010 | Geron et al. |
| 8,675,706 | B2 | 3/2014 | Seurin et al. |
| 2009/0161710 | A1 | 6/2009 | Hoashi et al. |
| 2014/0312233 | A1 | 10/2014 | Mark et al. |
| 2015/0311673 | A1 | 10/2015 | Wang et al. |
| 2017/0299722 | A1 | 10/2017 | Ouyang et al. |
| 2017/0307736 | A1 | 10/2017 | Donovan |
| 2018/0113208 | A1 | 4/2018 | Bergeron et al. |
| 2018/0269646 | A1 | 9/2018 | Welford et al. |
| 2018/0301872 | A1 | 10/2018 | Burroughs et al. |
| 2018/0301874 | A1 | 10/2018 | Burroughs et al. |
| 2018/0301875 | A1* | 10/2018 | Burroughs ............ H01S 5/0071 |
| 2019/0036308 | A1 | 1/2019 | Carson et al. |

FOREIGN PATENT DOCUMENTS

| | | |
|---|---|---|
| JP | 7-319560 A | 12/1995 |
| JP | 8-280173 A | 10/1996 |
| JP | 2003-208125 A | 7/2003 |
| JP | 2004-078255 A | 3/2004 |
| JP | 2008-180719 A | 8/2008 |
| JP | 2009-170870 A | 7/2009 |
| JP | 2014-059302 A | 4/2014 |
| JP | 2016-188808 A | 11/2016 |
| JP | 2019-68528 A | 4/2019 |
| KR | 10-2018-0115799 A | 10/2018 |
| WO | 2018/191495 A1 | 10/2018 |
| WO | 2020/210176 A1 | 10/2020 |

OTHER PUBLICATIONS

Knodl, et al., "Bipolar Cascade VCSEL with 130% Differential Quantum Efficiency", Annual Report 2000, Optoelectronics Department, pp. 11-14.

International Search Report and Written Opinion received for PCT Patent Application No. PCT/US2020/026964, mailed on Jul. 28, 2020, 8 pages.

International Preliminary Report on Patentability received for PCT Patent Application No. PCT/US2020/026964, mailed on Oct. 21, 2021, 7 pages.

Extended European Search Report received in European Application No. 20787345.6, mailed on Dec. 5, 2022, 8 pages.

Office Action received for Korean Application Serial No. 10-2021-7036300, mailed on Feb. 9, 2023, 14 pages (7 pages of English Translation and 7 pages of Official Copy).

Office Action received for Japanese Patent Application No. 2021-559434, mailed on May 26, 2023, 17 pages (11 pages of English Translation and 6 pages of Official Copy).

Office Action received for Japanese Patent Application Serial No. 2021-559434, mailed on Dec. 26, 2023, 6 pages (4 pages of English Translation and 2 pages of Official Copy).

Decision to Grant received for Korean Application Serial No. 10-2021-7036300, mailed on Dec. 6, 2023, 3 pages (1 page of English Translation and 2 pages of Official Copy).

Office Action received for Korean Application Serial No. 10-2021-7036300, mailed on Jul. 24, 2023, 7 pages (3 pages of English Translation and 4 pages of Official Copy).

* cited by examiner

SOLID-STATE LIDAR TRANSMITTER WITH LASER CONTROL

CROSS REFERENCE TO RELATED APPLICATION

The present application is a continuation of U.S. patent application Ser. No. 16/841,930, filed on Apr. 7, 2020, entitled "Solid-State LIDAR Transmitter with Laser Control", which claims benefit of U.S. Provisional Patent Application Ser. No. 62/831,668, filed on Apr. 9, 2019, entitled "Solid-State LIDAR Transmitter with Laser Control". The entire contents of U.S. patent application Ser. No. 16/841,930, and U.S. Provisional Patent Application Ser. No. 62/831,668 are all herein incorporated by reference.

The section headings used herein are for organizational purposes only and should not to be construed as limiting the subject matter described in the present application in any way.

INTRODUCTION

Autonomous, self-driving, and semi-autonomous automobiles use a combination of different sensors and technologies such as radar, image-recognition cameras, and ultrasonic transducers for detection and location of surrounding objects. These sensors enable a host of improvements in driver safety including collision warning, automatic-emergency braking, lane-departure warning, lane-keeping assistance, adaptive cruise control, and piloted driving. Among these sensor technologies, light detection and ranging (LIDAR) systems take a critical role, enabling real-time, high-resolution three-dimensional mapping of the surrounding environment.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Figure 1A:
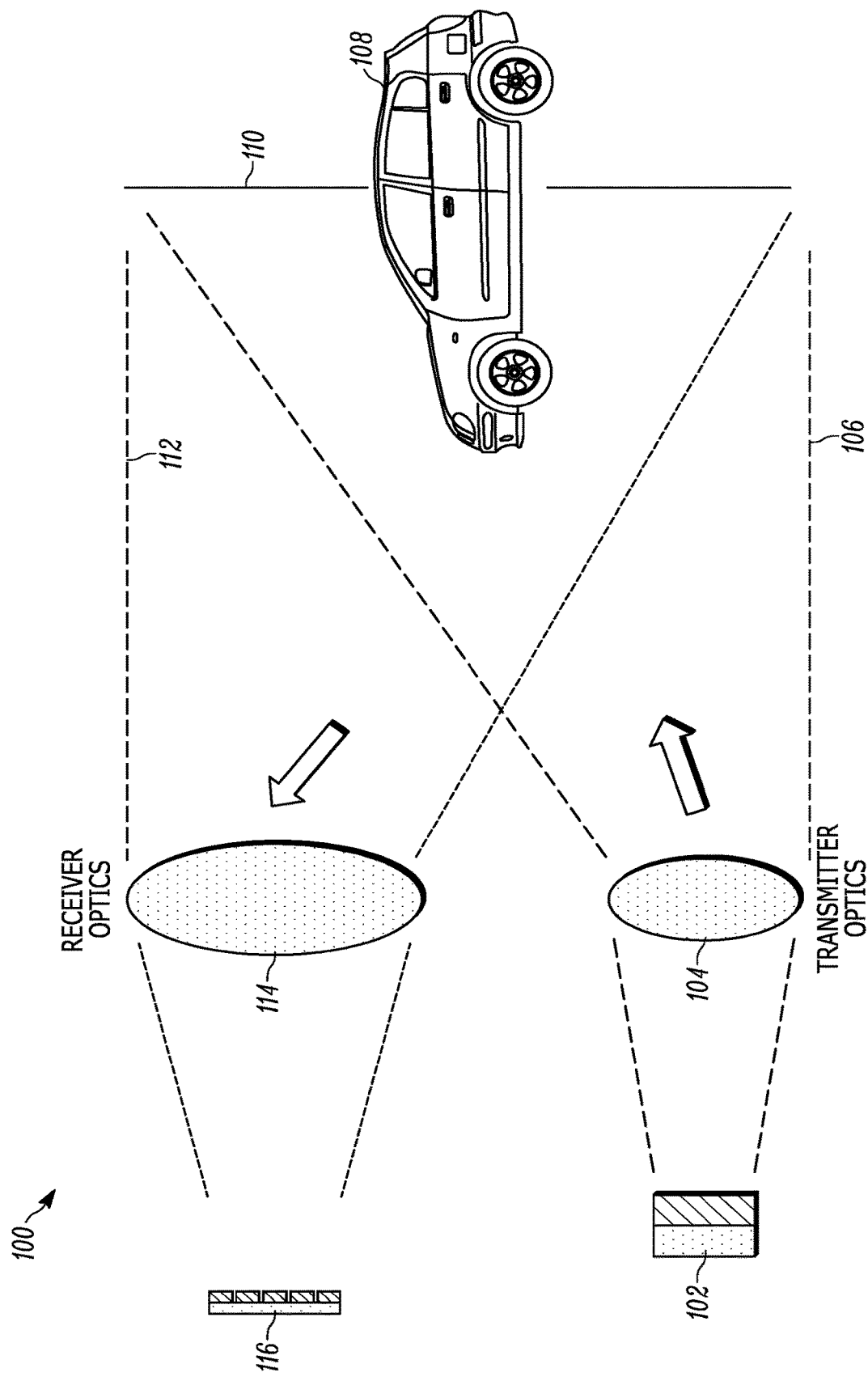
FIG. 1A illustrates a schematic diagram of a solid-state LIDAR system.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the method of the present teaching can be performed in any order and/or simultaneously as long as the teaching remains operable. Furthermore, it should be understood that the apparatus and method of the present teaching can include any number or all of the described embodiments as long as the teaching remains operable.

The majority of commercially available LIDAR systems used for autonomous vehicles today utilize a small number of lasers, combined with some method of mechanically scanning the environment. It is highly desirable for current automotive applications and future autonomous automotive applications to utilize solid-state semiconductor-based LIDAR systems. Solid-state LIDAR systems, particularly those with no moving parts, exhibit better reliability and can operate over wider environmental operating ranges compared to current LIDAR systems. Such solid-state systems for use in the LIDAR systems can also be physically compact and relatively low in cost.

One approach to solid-state LIDAR is to use a large number of lasers projecting each laser at a unique angle over the desired FOV, thereby avoiding the need for mechanical scanning. However, electrically connecting the driver circuits to large numbers of lasers, while retaining the ability to individually operate them is a challenge. One solution is to arrange the plurality of lasers into a 2D matrix, and then employing a matrix-addressable laser drive circuit that can simultaneously meet the need to control individual and/or groups of lasers in the array and to provide the optimal electrical characteristics (e.g. current, voltage and timing) to energize the lasers. The methods and apparatus of the present teaching relates to laser control method and system architectures that enable individual control of a 2D matrix of lasers, while ensuring a low-cost system.

FIG. 1A illustrates a schematic diagram of a solid-state LIDAR system 100 where individual lasers in a transmitter array 102 can be fired independently. The system illustrated in FIG. 1A does not employ a flash transmitter that illuminates a full system field-of-view all at once. Instead, each individual laser in a transmitter array 102 can be fired independently, with the optical beam emitted by each laser corresponding to a 3D projection angle subtending only a portion of the total system field-of-view. One example of such a transmitter is described in detail in U.S. Patent Publication No. 2017/0307736 A1, which is assigned to the present assignee. The entire contents of U.S. Patent Publication No. 2017/0307736 A1 are incorporated herein by reference.

The optical beams from the lasers in the laser array 102 share the transmitter optics 104 that project the optical beams 106 to a target 108 at a target plane 110. Portions of the light from the incident optical beams 106 are reflected by the target 108. Portions of the reflected optical beams 112 share the receiver optics 114. A detector array 116 receives the reflected light that is projected by the receiver optics 114. In various embodiments, the detector array 116 is solid-state with no moving parts. The detector array 116 can have a fewer number of individual detector elements than the transmitter array 102 has individual lasers.

The measurement resolution of the LIDAR system 100 is not determined by the size of the detector elements in the detector array 116, but instead by the number of lasers in the transmitter array 102 and the collimation of the individual optical beams. A processor (not shown) in the LIDAR system 100 performs a time-of-flight (TOF) measurement that determines a distance to a target 108 that reflects the optical beams 106 from the lasers in the laser array 102 as detected at the detector array 116.

One feature of the systems of the present teaching is that individual lasers and/or groups of lasers, in the transmitter array 102 can be individually controlled. Another feature of the systems of the present teaching is that individual detectors and/or groups of detectors in the detector array 116 can be individually controlled. This control provides for various desired performance characteristics, including control of field-of-view, optical power levels, scanning and/or other features.

Figure 1B:
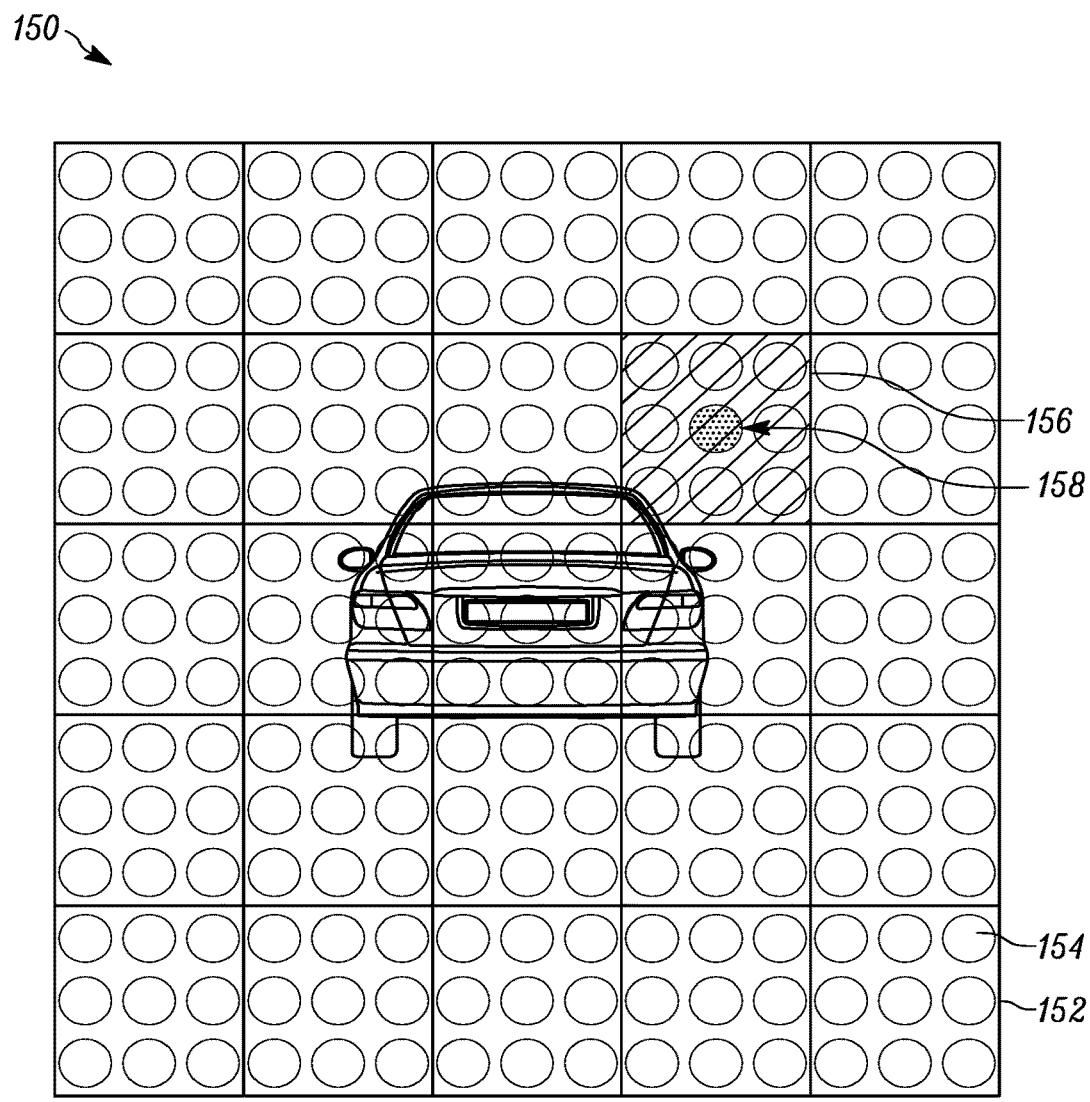
FIG. 1B illustrates a two-dimensional projection of the system field-of-view (FOV) of the LIDAR system of FIG. 1A.

FIG. 1B illustrates a two-dimensional projection of the system field-of-view 150 of the LIDAR system of FIG. 1A. A field-of-view of an individual detector in the detector array is represented by a small square 152. An illuminated measurement point associated with an individual laser in the transmitter is illustrated by a circle 154. As an example of a case with one energized laser element in the array, the light from the laser hits an individual detector field-of-view in the overall field-of-view of the LIDAR system of FIG. 1A. This detector field-of-view receiving the light is highlighted by hash marks in a particular square 156, and the field-of-view of the measurement point from the individual laser is shown as particular dark circle 158, which corresponds to a specific individual laser in the laser array.

It can be seen in FIG. 1B that the measurement point illustrated by circle 158 falls within an individual detector where the field-of-view of that individual detector has been shown in the square 156 with a cross-hatch pattern for identification. This figure illustrates that the 3D resolution of some embodiments of the LIDAR system are determined by the number of lasers, as each laser corresponds to a specific angular projection angle that gives rise to the size of the circles 154 at the target range, and the relative size of the circles 154 and the squares 152 that represent the field-of-view of an individual detector element. Thus, various fields-of-views can be established by controlling particular individual or groups of lasers in a transmitter array to selectively be energized and transmit a laser pulse and/or particular individual or groups of detectors in a receive array to convert a received optical signal in the detector(s) field of view to an electrical signal. One feature of the present teaching is an array drive control system that is able to provide such selective device control for an array of laser devices that are capable of illuminating a target.

In some embodiments, the field-of-view of an individual detector in the detector array is the active area of a detector. The individual detector size within the array is largely determined by the electrical characteristics of the device. For example, as the size of the active area of an avalanche photodiode (APD) detector increases, the capacitance of the detector increases, reducing the optical-electrical bandwidth of the device. The bandwidth of the APD must be maintained high enough to not attenuate or distort the received signal. Typical values for the Optical-to-Electrical (O/E) bandwidth and APD capacitance in a LIDAR system with laser pulse widths<10 nsec and having a rise/fall time of ~1 nsec, are 350 MHz, and less than 2 pF, respectively. In general, to cover the full field-of-view of the LIDAR system while maintaining acceptable electrical detector performance, an array of detectors must be used. The overall physical size and dimensions of the array are determined by the required field-of-view and the specifications of the optical lens system of the receiver.

Figure 2:
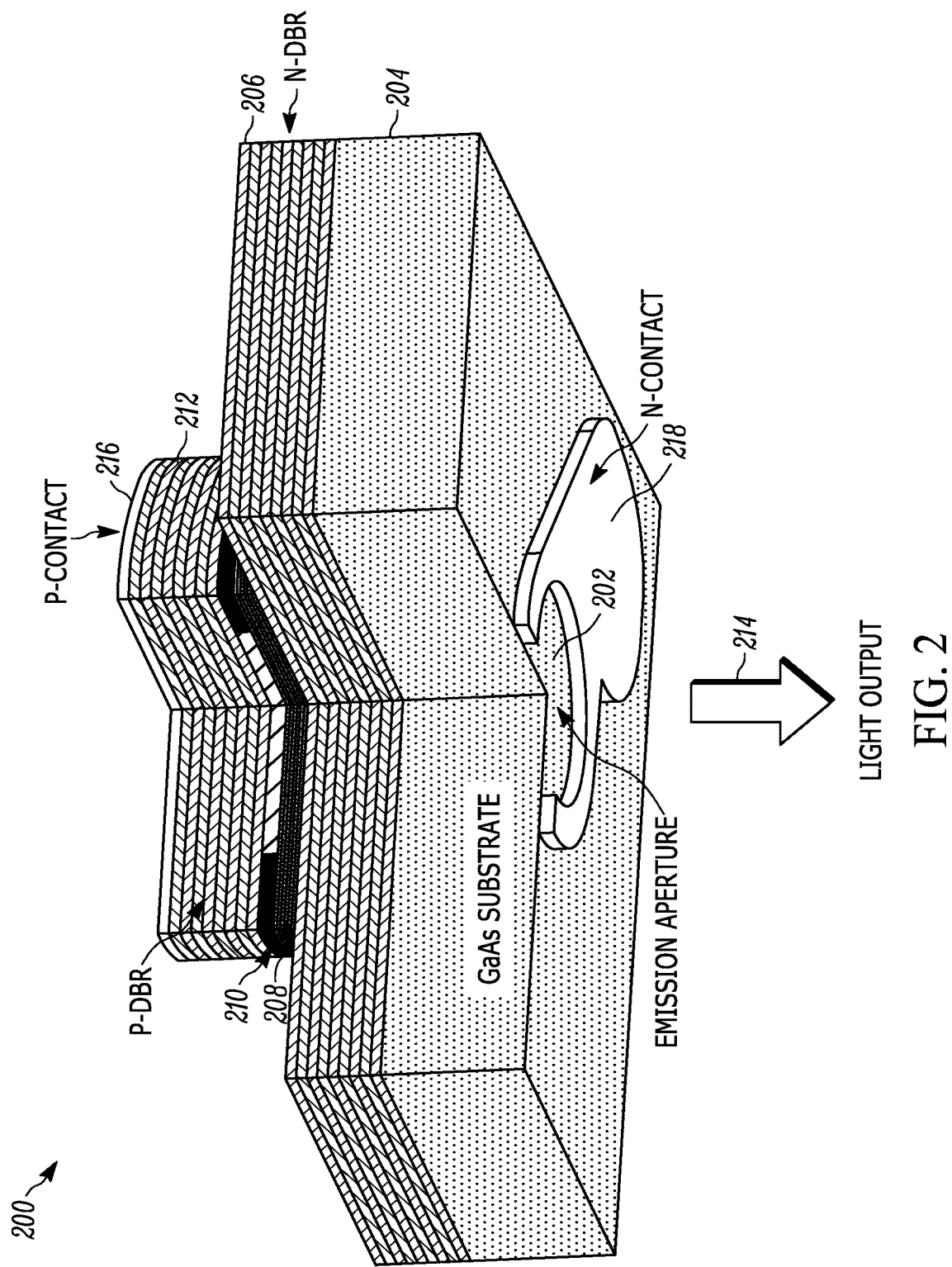
FIG. 2 illustrates a perspective view of a structure of a known bottom-emitting Vertical Cavity Surface Emitting Laser (VCSEL) that can be used in a LIDAR system according to the present teaching.

FIG. 2 illustrates a perspective view of a structure of a known bottom-emitting VCSEL 200 that can be used in a LIDAR system according to the present teaching. The area of the emission aperture 202 of the VCSEL 200 typically ranges from a few microns in diameter for mW power operation, up to 100 microns diameter or more for 100 mW and greater CW power operation. The VCSEL 200 is fabricated on a substrate 204 that can be, for example, GaAs, or numerous other semiconductor materials. An n-type distributed Bragg reflector (DBR) layer 206 is positioned on the substrate. An active region 208 is constructed on the n-type DBR layer 206, followed by an aperture that can be made formed in an oxide material. A p-type DBR layer 212 is then grown on the active region. Typically, the p-type DBR layer 212 is highly reflecting, and the n-type DBR layer 206 is partially reflecting, resulting in light output 214 from the bottom, substrate-side of the layer structure. The active region 208, oxide aperture 210, and p-type DBR layer 212 are formed in a mesa structure in the device shown. A top contact 216 and a bottom contact 218 are used to provide an electrical current to the active region to generate the output light. An oxide aperture 210 provides current confinement to the active region 208. The top contact 216 is p-type, and the bottom contact 218 is n-type.

Emission apertures 202 are formed in the bottom contact 218 to allow the output light 214 to emerge from the bottom, substrate side of the bottom-emitting VCSEL 200. Note that only one emission aperture 202 is shown in FIG. 2 because FIG. 2 illustrates only one element of a multi-element VCSEL array. This type of VCSEL can be a stand-alone single element, or can be part of a multiple element VCSEL that can be fabricated as one- or two-dimensional arrays on the substrate 204. The VCSEL contacts 216, 218 can be addressed individually and/or they can be electrically connected together in various configurations to address groups of VCSELS with a common electrical input signal. One feature of the present teaching is a system and method for controlling the energizing of the one or more VCSEL 200 devices in an array with an appropriate drive signal for the LIDAR system application.

In some embodiments, VCSEL arrays used in the solid-state LIDAR systems of the present teaching are monolithic and the lasers all share a common substrate on which the lasers are integrated. A variety of common substrate types can be used. For example, the common substrate may be a semiconductor material. The common substrate may also include a ceramic material. In other embodiments, a 2D VCSEL array is assembled from a group of 1D bars or even individual die.

In some embodiments, the VCSELs are top-emitting VCSEL devices. In other embodiments, the VCSEL devices are bottom-emitting VCSELS. The individual VCSEL devices may have either a single large emission aperture, or the individual VCSEL devices may be formed from two or more sub-apertures within a larger effective emission diameter. A group of sub-apertures forming a larger effective emission region is sometimes referred to as a cluster.

Figure 3:
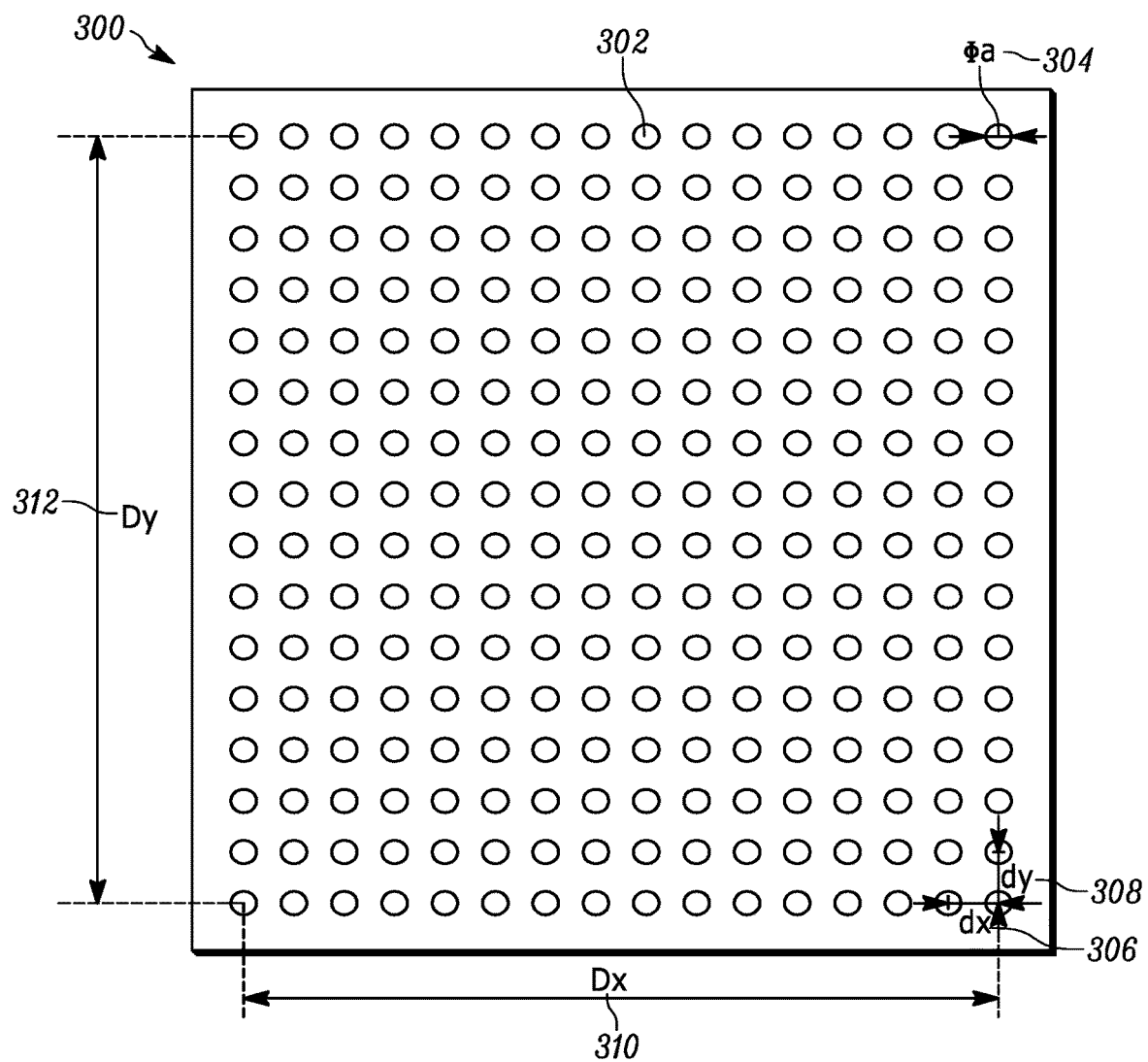
FIG. 3 illustrates a schematic diagram of an embodiment of a two-dimensional (2D) monolithic VCSEL array with 256 separate laser emitters for use in a solid-state LIDAR system according to the present teaching

FIG. 3 illustrates a schematic diagram of an embodiment of a 2D monolithic VCSEL array 300 with 256 separate laser emitters 302 for use in a solid-state LIDAR system according to the present teaching. Each laser emitter 302 has an emission aperture of diameter "a" 304. Emission from each single laser emitter 302 substantially fills the full emission aperture. Each laser emitter 302, therefore, generates a laser beam with initial diameter "a" which is equal to the diameter, "a" 304, of the emission aperture. The laser emitters 302 are spaced uniformly in the horizontal direction with a spacing, dx 306, and are spaced uniformly in the vertical direction with a spacing, dy 308. The overall size of the array, measured from the centers of the outermost lasers is distance, Dx 310, in the horizontal direction and distance, Dy 312, in the vertical direction. The actual chip size will be slightly larger in dimension than the distance, Dx 310, and the distance, Dy 312. In various embodiments, the emitters 302 can produce beams with various shapes other than the circular emitter shape. For example, oval, square, rectangular and various odd shapes may be realized in various embodiments. In embodiments in which lasers are arranged as 2D arrays, the rows and columns of the lasers can be driven electrically in a matrix addressable fashion.

Some embodiments of the present teaching utilize bottom-emitting high-power arrays of VCSEL devices with a single large aperture per laser, such as the configuration shown in FIG. 3. Other embodiments of the present teaching utilize top-emitting or bottom-emitting high-power arrays of VCSELs with an overall emission area comprising sub-apertures. However, one skilled in the art will appreciate that the present teaching is not limited to any particular configurations of top- and bottom-emitting VCSEL devices and associated emission apertures.

Two-dimensional VCSEL arrays can be used as building blocks for the LIDAR systems according to the present teaching to establish a platform that allows a small physical size for the transmitter. For example, a 2D VCSEL array with 256 high-power individual lasers can be constructed on a monolithic chip that is approximately 4 mm×4 mm. Such monolithic chips can be used together with optics that are chosen to keep the physical dimension as small as possible, for example, through the use of micro-lens arrays, shared lenses of dimension less than 20 mm, or diffractive optics of maximum dimension of about 20 mm.

However, the LIDAR systems according to the present teaching put certain requirements on the 2D VCSEL arrays. In particular, it is desirable that the 2D VCSEL arrays allow for simultaneous control of all VCSEL devices independently. In some modes of operation of the LIDAR system of the present teaching, each VCSEL within a matrix is fired at a different time. For such operation, the VCSEL array needs to be operated in a matrix-addressable fashion where lasers can be fired individually, but not always simultaneously.

Figure 4:
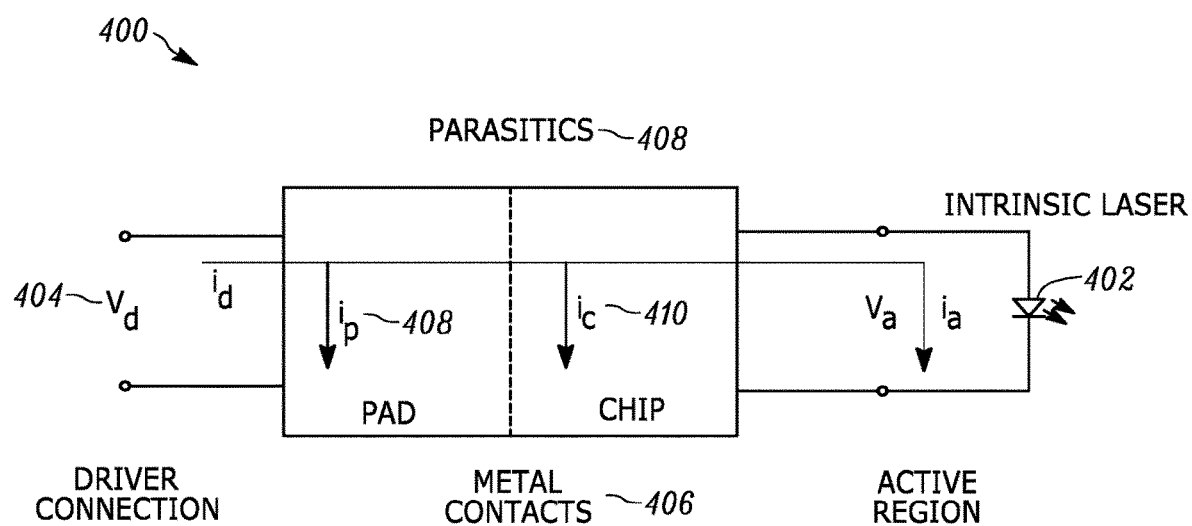
FIG. 4 illustrates an exemplary cascaded two-port circuit model for an embodiment of an individual semiconductor laser of a VCSEL array according to the present teaching.

FIG. 4 illustrates an exemplary cascaded two-port circuit model 400 for an embodiment of an individual semiconductor laser of a VCSEL array according to the present teaching. The intrinsic laser junction is represented by the commonly known symbol of a diode 402. The active region of the laser, which emits the laser light, is sandwiched between the p-n junction of a diode. The circuit model 400 includes a driver connection 404, that supplies a voltage, $V_d$, and the electrical characteristics of the metal contacts 406. In addition, the circuit model 400 includes parasitic elements 408, which include pad resistive losses in the form of parasitic pad current 408, $i_p$, and parasitic chip current 410, $i_p$.

In one embodiment, the solid state LIDAR system of the present teaching uses VCSEL devices that are assembled using heterogeneous integration techniques. For example, these devices can be flip-chip bonded to silicon electronics to provide a highly compact method of connecting to and electrically driving the VCSEL. See, for example, Plant et al., "256-Channel Bidirectional Optical Interconnect Using VCSELs and Photodiodes on CMOS", IEEE Journal of Lightwave Technology, Vol. 19, No. 8, August 2001. See also, U.S. Pat. No. 7,702,191, entitled "Electro-Optical Chip Assembly" and U.S. Pat. No. 8,675,706, entitled "Optical Illuminator that Fire Devices in Parallel". However, these known heterogeneous integration techniques have largely been directed to applications in the optical communication market where simultaneous parallel operation of multiple-channels are desired as a solution to increase data transmission throughput.

Figure 5A:
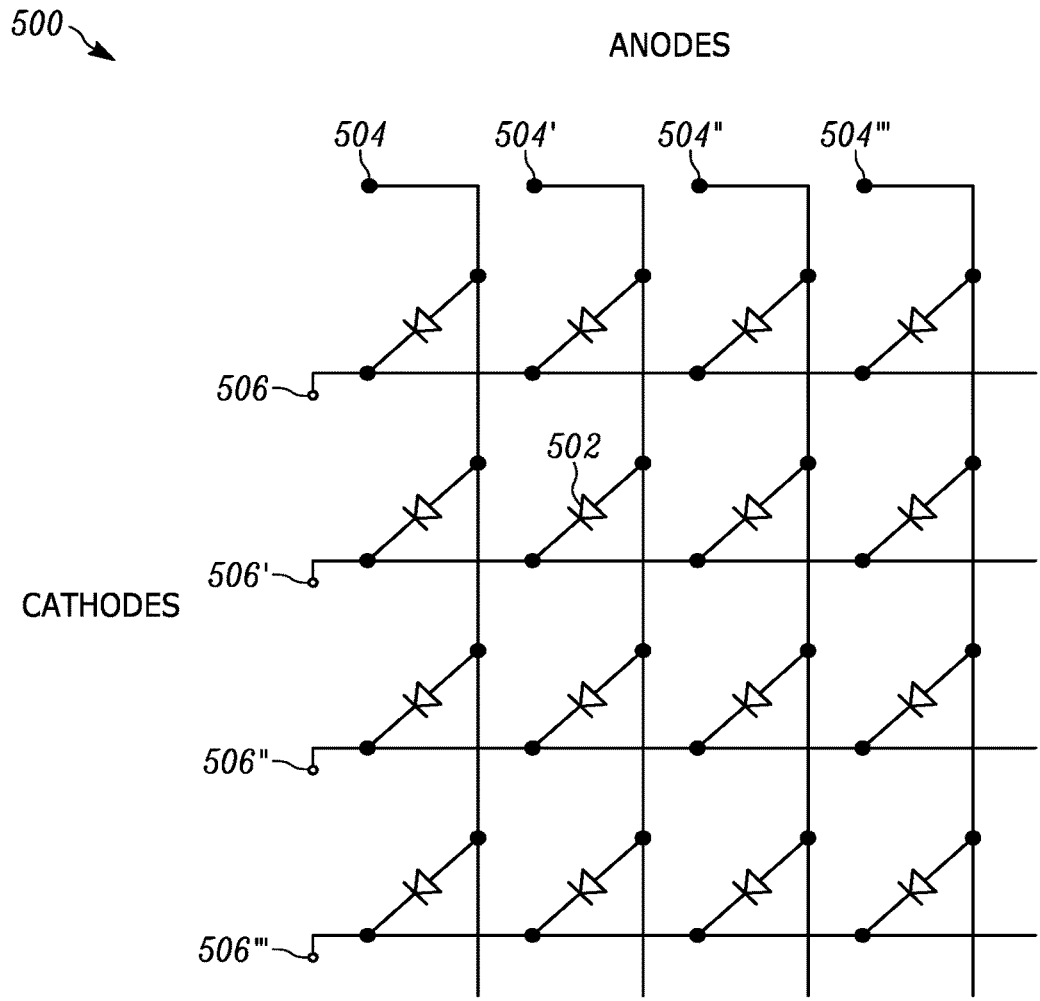
FIG. 5A illustrates an electrical schematic of an embodiment of a matrix-addressable laser drive circuit for controlling a two-dimensional laser array with row/column matrix addressability according to one embodiment of the present teaching.

FIG. 5A illustrates an electrical schematic of an embodiment of a matrix-addressable laser drive circuit configured as a 2D laser array 500 with row/column matrix addressability according to one embodiment of the present teaching. For simplicity in this and the following figures, the diode symbol 502 is used here to represent the laser, but it is understood that the laser is more accurately represented by the model 400 described in connection with FIG. 4 and that such models would be used in the actual design. Also, for simplicity, only a 4×4 matrix of diodes is shown in the schematic 500 and the voltage and/or current drivers that drive the matrix-addressable laser drive circuit is not shown. However, it is understood that in practice, the matrix of laser diodes is M×N, where M and N are arbitrary integer numbers that are greater than or equal to two and that, in some embodiments, M and N are large numbers.

The matrix-addressable laser drive circuit for a 2D laser array 500 is configured so that the VCSEL devices 502 are connected to the anodes 504, 504', 504", 504'". The rows of VCSEL devices 502 are connected by the cathodes 506, 506', 506", 506'". This anode-column and cathode-row connection configuration illustrated in the schematic 500 allows the individual lasers 502 to be turned on/off through operation of rows and columns, rather than needing individual access to the cathode and anode of a single laser 502.

Figure 5B:
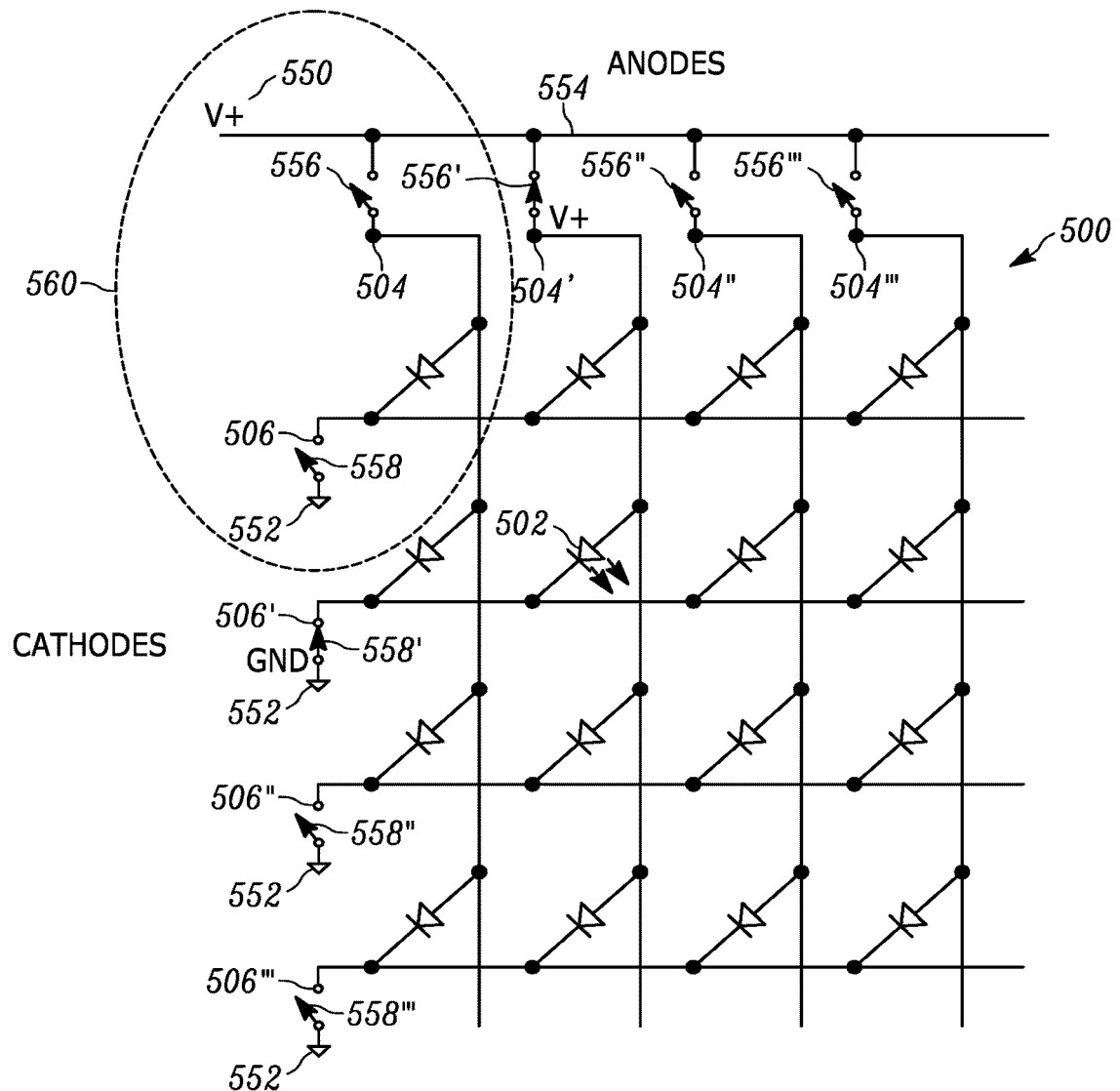
FIG. 5B illustrates an embodiment of a matrix-addressable laser drive circuit configured as a voltage driver in which a single laser within a 2D laser array is energized using row/column matrix addressability according to the present teaching.

FIG. 5B illustrates an embodiment of a matrix-addressable laser drive circuit configured as a voltage driver in which a single laser 502 within a 2D laser array 500 is energized using row/column matrix addressability according to the present teaching. A power supply 548 applies a voltage potential 550 relative to ground 552 via an anode contact electrical bus 554 electrically connected to the columns of anodes 504, 504', 504", 504'" with a series of switches 556, 556', 556", 556'" and a ground bus 552 connected to the rows of cathodes 506, 506', 506", 506'" with a series of switches 558, 558', 558", 558'". The power supply 548 generates the voltage potential 550, $V_+$, with a desired voltage potential waveform. The column of anodes for that VCSEL that is being energized to turn on are connected via switch 556' to a voltage potential 550 that is high enough to forward bias the VCSEL, diode 550. The row of cathodes 506' containing that VCSEL are connected to ground bus 552 via switch 558' to complete the circuit, thereby allowing current to flow through the VCSEL, energizing the laser so that it emits light. The other cathodes and anodes are set to an "open" condition where they are not provided any specific voltage level by the power supply 548 by having open switches 556, 556", 556'" and open switches 558, 558", 558'".

In an alternative embodiment of the circuit shown in FIG. 5B, the cathodes 506, 506", and 506"" are not "open" but instead are connected to the power supply 548 (or another power supply) which provides a voltage potential waveform with a voltage that is set at some predetermined voltage level during operation, which is less than V+. In other words, the potential on ground bus 552 indicated in FIG. 5B may not be ground potential, but instead can be a voltage level set by the power supply 548 that is less than V+ during operation so that the voltage potential 550 is applied relative to the predetermined voltage. In these embodiments, switches 556, 556", 556'", 558, 558", 558'" would toggle between the anode or cathode voltage potential 550 and a voltage source (not shown) that is set to this defined voltage level. This alternative embodiment can have performance advantages, such as reduced cross-talk. A more detailed circuit that implements this embodiment is described in connection with FIG. 5E.

One feature of the laser array controller of the present teaching is that it can use a variety of laser drive circuits to provide desired laser drive characteristics. In some embodiments, the power supply 548 driving the lasers generates high-current, short duration pulses. In these embodiments, the power supply 548 is designed to provide the necessary high-current and short-duration pulses. Also, the matrix can be operated by having the power supply 548 apply a potential waveform with a defined voltage (so-called voltage driver) or a current waveform with a defined current level (so-called current driver).

In some embodiments, the power supply 548 is configured to produce a waveform that reduces the power dissipation when a pulse is not being generated. This can be achieved, for example, by using a circuit configuration that provides a near or total shut down of the output of the power supply 548 during the down time between the applications of short-duration pulses. In one such embodiment, the power supply energizes the laser driver during a wake-up period before the short-duration pulse is generated and then the pulse is generated. The power supply 548 produces a waveform shut-down for a time between pulses that is initiated after the pulse has been fired. This waveform shut-down period is proceeded by a wake-up period before the short duration pulse is generated again. Some power supplies also have a "lower power" state that is used to further reduce power consumption. For example, in practical implementations, a controller in the power supply or a separate controller can execute a series of commands, such as the following commands: (1) put laser driver power supply in a "low power state"; (2) put laser driver power supply in "wake-up" mode; (3) turn laser driver power supply output "on"; (4) turn laser driver power supply output "off"; and (5) return laser driver to "low power state".

Figure 5C:
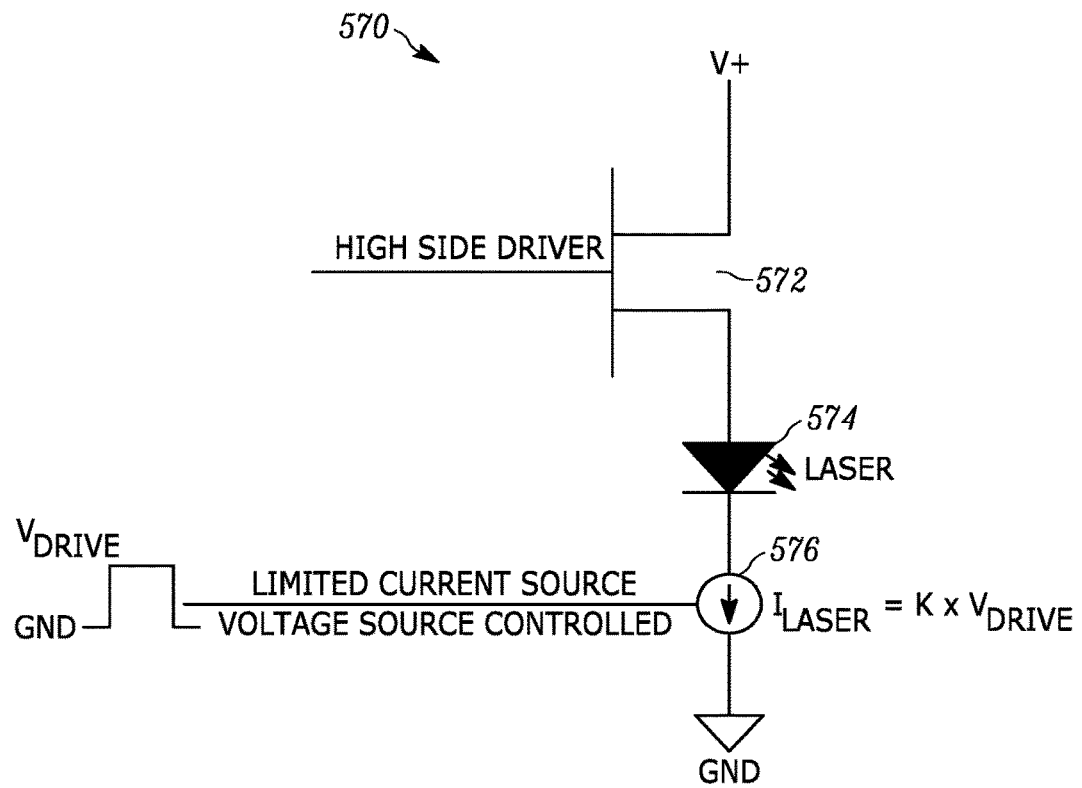
FIG. 5C illustrates an electrical schematic diagram of a single matrix-addressable laser drive configured as a high-side current driver that can be used with a 2D laser array with row/column matrix addressability according to one embodiment of the present teaching.

FIG. 5C illustrates an electrical schematic diagram of a single matrix-addressable laser drive 570 configured as a high-side current driver that can be used with a 2D laser array with row/column matrix addressability according to one embodiment of the present teaching. The high-side configured laser driver 570 includes a field effect transistor (FET) 572 with the FET source coupled to a power supply a potential V+ and the FET drain coupled to an anode of a laser diode 574. The drive current for the laser diode 574 is provided by a voltage controlled current source 576 so that laser current is proportional to the drive voltage.

Figure 5D:
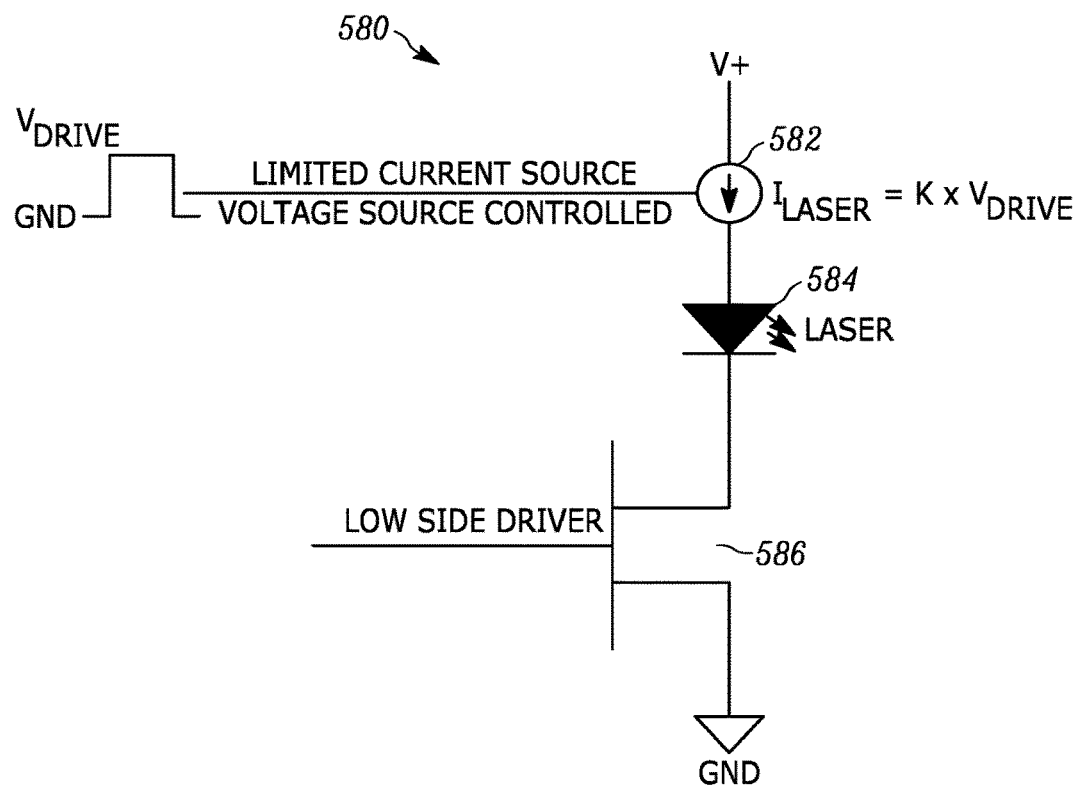
FIG. 5D illustrates an electrical schematic diagram of a single matrix-addressable laser drive configured as a low-side current driver that can be used with a 2D laser array with row/column matrix addressability according to one embodiment of the present teaching.

FIG. 5D illustrates an electrical schematic diagram of a single matrix-addressable laser drive 580 configured as a low-side current driver that can be used with a 2D laser array with row/column matrix addressability according to one embodiment of the present teaching. The laser driver 580 includes a voltage controlled current source 582 having an input coupled to a power supply. The output of the voltage controlled current source 582 is connected to the anode of a laser diode 584. A field effect transistor (FET) 586 has a source coupled to the anode of the laser diode 584 and a drain coupled to ground.

Figure 5E:
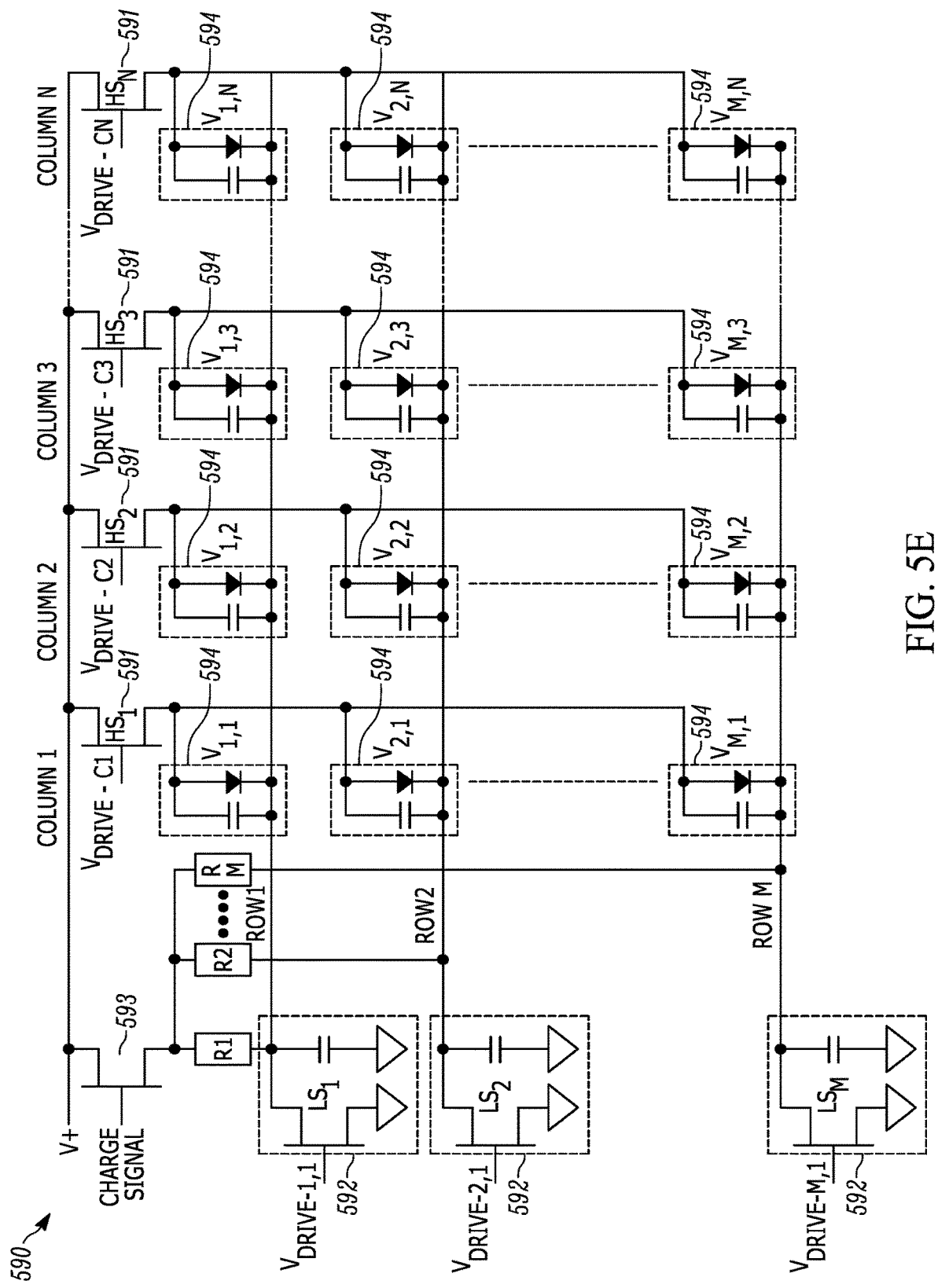
FIG. 5E illustrates an electrical schematic diagram of a matrix-addressable laser drive circuit configured with high-side voltage drivers for the columns, low-side voltage drivers for the rows, and a switch that can be used to apply an additional voltage to the rows, that can be used with a 2D laser array with row/column matrix addressability according to one embodiment of the present teaching.

FIG. 5E illustrates an electrical schematic diagram of a matrix-addressable laser drive circuit 590 configured with high-side voltage drivers 591 for the columns, low-side voltage drivers 592 for the rows, and a switch that can be used to apply an additional voltage to the rows, that can be used with a 2D laser array with row/column matrix addressability according to one embodiment of the present teaching. A voltage divider circuit 593 is used to set the voltage between the rows of the 2D laser array. The voltage divider circuit 593 is controlled by applying a charge signal to its FET gate. The laser diodes 594 are shown together with their associated parasitic capacitors.

The configuration of the matrix-addressable laser drive circuit 590 is similar to the alternative embodiment of the circuit shown in FIG. 5B, where the cathodes of the laser diodes are not at ground potential during normal operation and instead are at another potential. However, in this circuit, the addition of the switch 593 allows for a more sophisticated control of the voltage applied to the cathodes. In the matrix-addressable laser drive circuit 590 configuration shown in FIG. 5E, the cathodes of the laser diodes are at a potential that is determined by the voltage divider 593, which is controlled by the charge signal applied to its FET gate. Operating the matrix-addressable laser drive circuit 590 so that the laser diodes are reverse biased such that the cathodes are at a potential other than ground potential can have numerous performance advantages. One such performance advantage is that cross talk between the laser diodes can be significantly reduced.

Figure 5F:
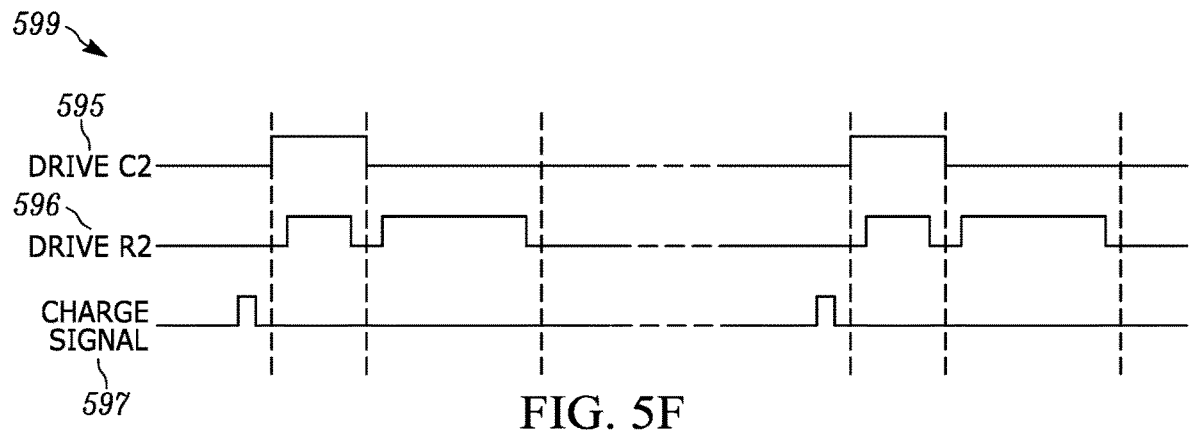
FIG. 5F illustrates a voltage potential timing diagram showing one method of operating the matrix-addressable laser drive circuit according to one embodiment of the present teaching.

FIG. 5F illustrates a voltage timing diagram 599 showing one method of operating the matrix-addressable laser drive circuit 590 described in connection with FIG. 5E. Waveforms are shown for the column drive signal C2 595 applied to the high-side voltage driver 591, the row drive signal R2 596 applied to the low-side voltage driver 592, and for the charge signal 597 applied to the voltage divider 593.

An optical pulse is generated only when the column drive signal 595 and the row drive signal 596 are both high. The row drive signal's pulse duration determines the optical pulse width. The duty cycle depends upon various operating parameters. For example, in one method of operation, duty cycle of the optical pulses is 1%. The column drive signal 595 pulse is longer than the row drive signal 596 pulse. This prevents racing between the row and column pulses.

One important feature of the methods and apparatus of the present teaching is that various laser driver circuit configurations and methods of operation reduce cross talk and, therefore increase performance. Referring to the matrix-addressable laser drive circuit 590 described in connection with FIG. 5E, cross talk can occur when a laser diode is indirectly energized via an electrical path through its associated parasitic capacitor and low side driver. This undesirable consequence can be prevented in the configuration shown in FIG. 5E by charging the parasitic capacitors to voltage +V which sets the laser diodes 594 in reverse bias. Therefore, when the desired laser diodes are energized, there should be no other laser diodes emitting light. However, methods that bias the laser diodes 594 in a continuous reverse bias condition will result in an increased device failure rate and a lower overall device reliability. One solution according to the present teaching is to energize the low-side driver to discharge the laser diode's parasitic capacitors during the remainder of the duty cycle when the laser diodes are not intentionally energized. For example, the energizing would typically be done during the about 99% off duration for a 1% duty cycle.

Figure 5G:
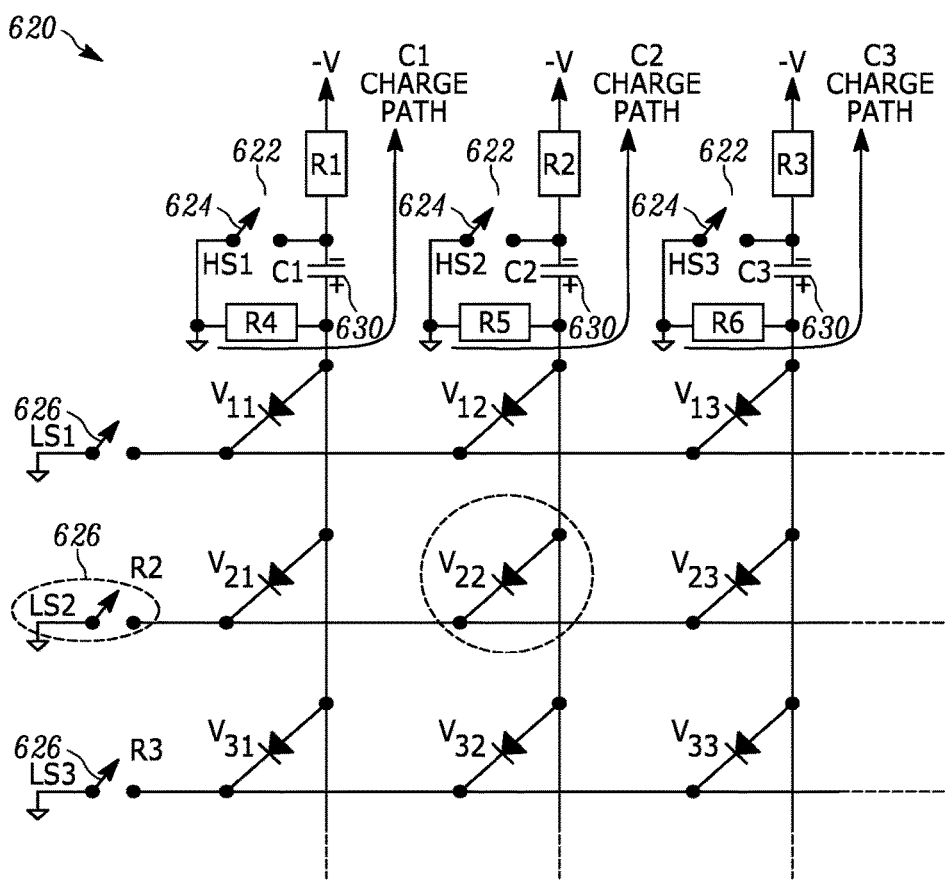
FIG. 5G illustrates an electrical schematic diagram of a matrix-addressable laser drive circuit configured with a high-side capacitive discharge circuit in the capacitor charging mode according to one embodiment of the present teaching.

FIG. 5G illustrates an electrical schematic diagram of a matrix-addressable laser drive circuit 620 configured with a high-side capacitive discharge circuit 622 in the capacitor charging mode. The drive circuit 620 is similar to the drive circuit 500 described in connection with FIG. 5A, but includes the high-side capacitive discharge circuit 622. In the capacitor charging mode, all the high-side switches 624 and all the low-side switches 626 are open thereby allowing the capacitors C1-C3 630 to charge with a time constant to the full potential applied to the drive circuit 620, which is indicated as −V.

Figure 5H:
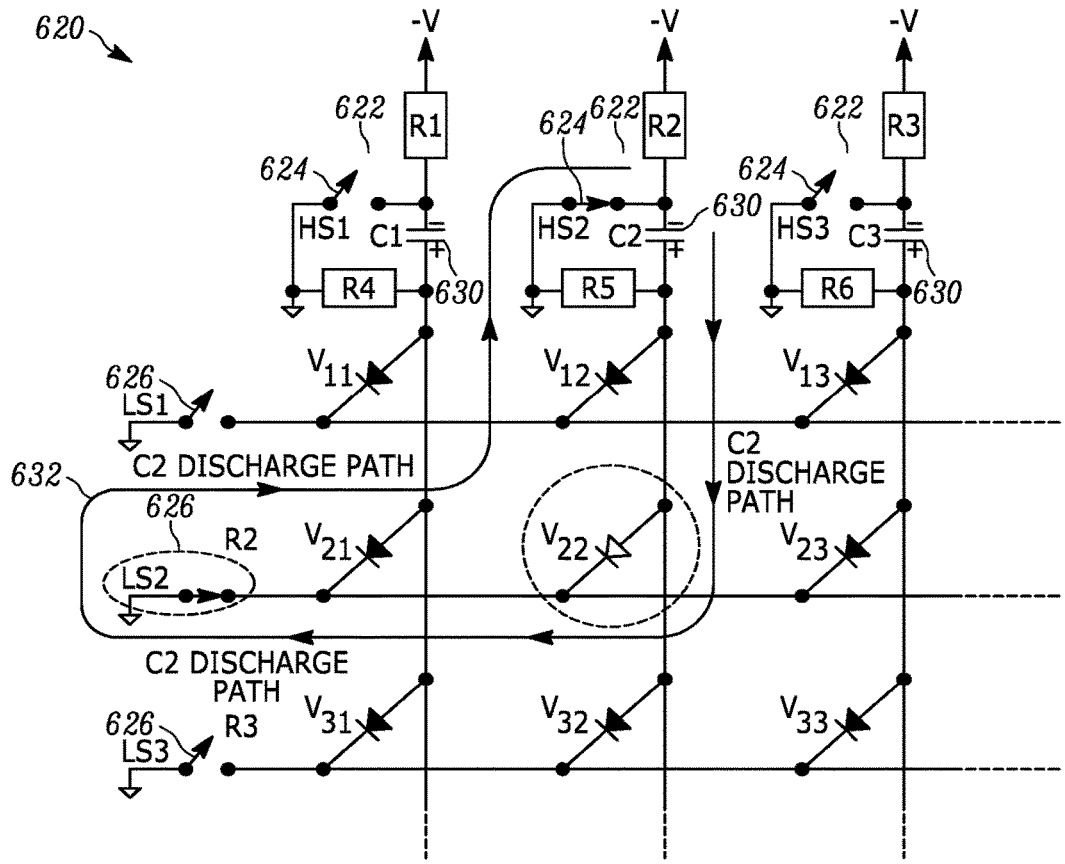
FIG. 5H illustrates an electrical schematic diagram of the matrix-addressable laser drive circuit described in connection with FIG. 5G, but configured with the high-side capacitive discharge circuit in the capacitor discharge mode for laser diode 2,2 (second row and second column) according to one embodiment of the present teaching.

FIG. 5H illustrates an electrical schematic diagram of the matrix-addressable laser drive circuit 620 described in connection with FIG. 5G, but configured with the high-side capacitive discharge circuit 622 in the capacitor discharge mode for laser diode 2,2 (second row and second column). In the capacitor discharge mode for laser diode 2, 2, both the high-side switch 624 and the low-side switch 626 are closed causing a discharge of electrical current in the path 632.

Figure 5I:
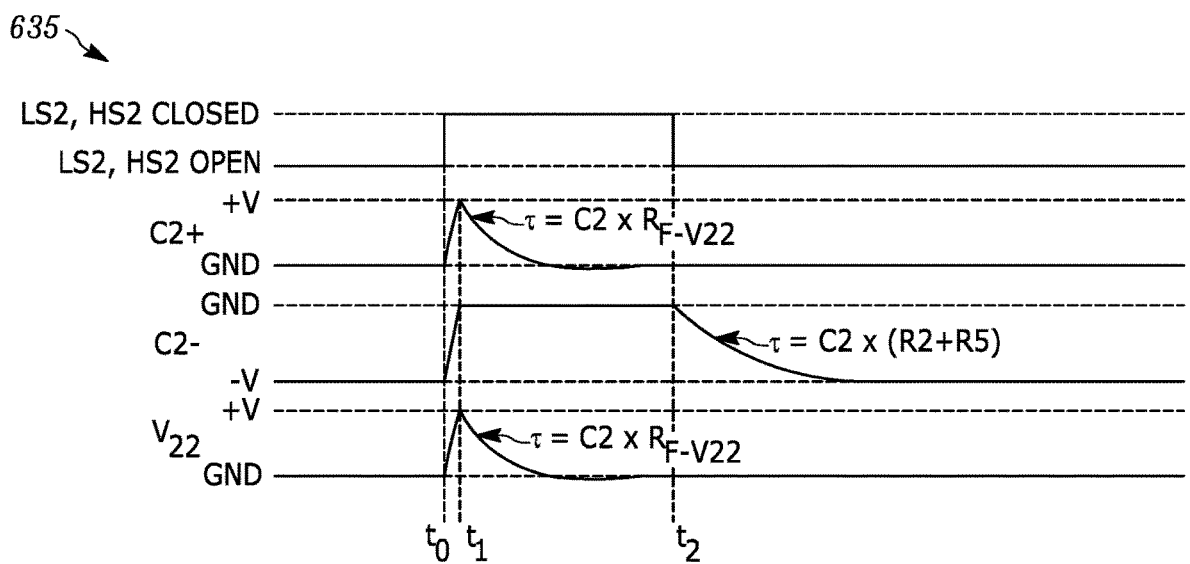
FIG. 5I illustrates a voltage potential timing diagram showing the voltage potential across capacitor $C_2$ and across the laser diode 2,2 in the second row and second column according to one embodiment of the present teaching.

FIG. 5I illustrates a voltage potential timing diagram 635 showing the voltage potential across capacitor $C_2$ and across the laser diode 2,2 in the second row and second column. The switches LS2 and HS2 are closed until initial time t0. Before time t0, potential C2+ is at ground potential and potential C2− is at −V potential. At time t0, the switches LS2 626 and HS2 624 are closed causing potential C2− to transition to ground potential and causing potential C2+ to charge to +V potential reaching these potentials at time $t_1$. After the anode of laser diode 2,2 charges to +V potential, the capacitor C2 discharges from potential C2+ via laser diode 2,2 thereby generating an optical pulse. At time $t_2$, the switches LS2 and HS2 are closed to initiate conditions for the following pulse. The result of this switching sequence is that the discharge control method generates an analog driving pulse where the power consumption is independent of the pulse width.

Figure 5J:
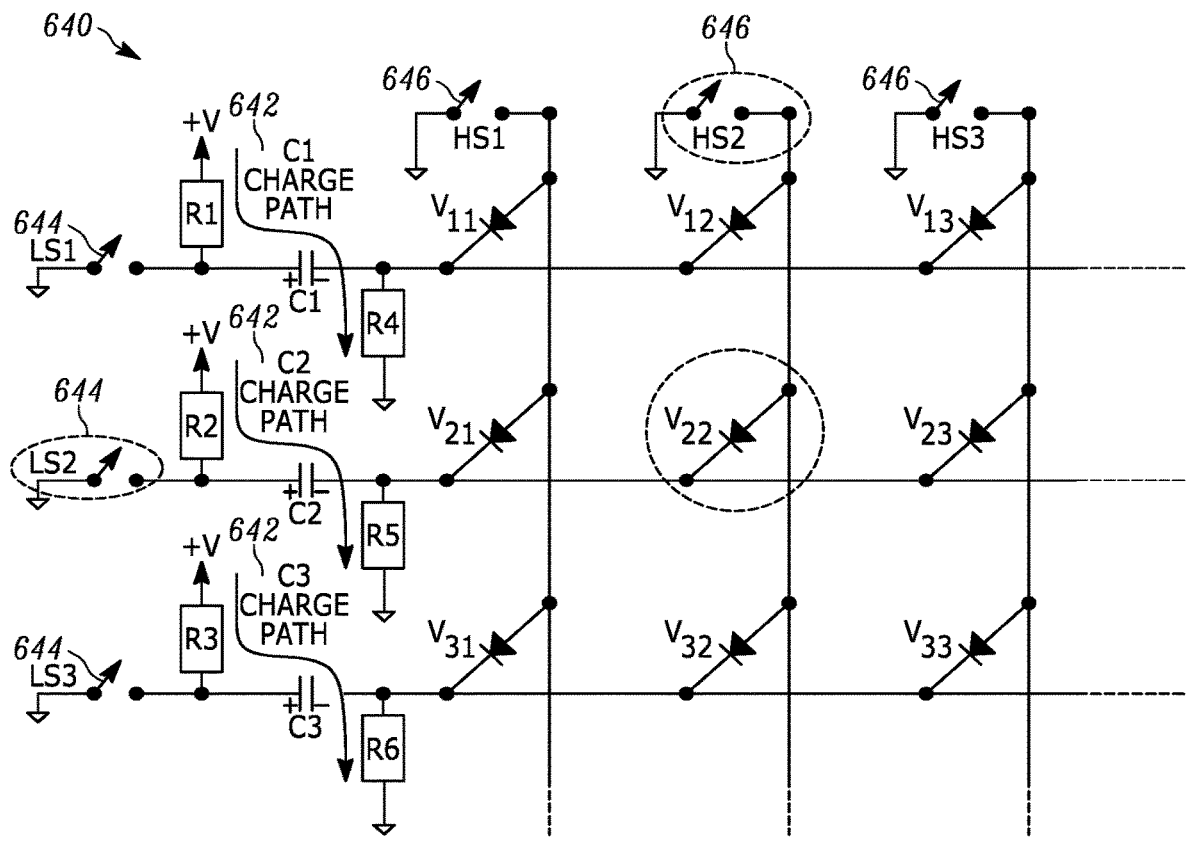
FIG. 5J illustrates an electrical schematic diagram of a matrix-addressable laser drive circuit configured with a low-side capacitive discharge circuit in the capacitor charging mode according to one embodiment of the present teaching.

FIG. 5J illustrates an electrical schematic diagram of a matrix-addressable laser drive circuit 640 configured with a low-side capacitive discharge circuit 642 in the capacitor charging mode. The drive circuit 640 is similar to the drive circuit 500 described in connection with FIG. 5A, but includes the low-side capacitive discharge circuit 642. In the capacitor charging mode, all the low-side switches 644 and all the high-side switches 646 are open thereby allowing the capacitors C1-C3 626 to charge with a time constant to the full potential applied to the drive circuit 640, which is indicated as +V potential.

Figure 5K:
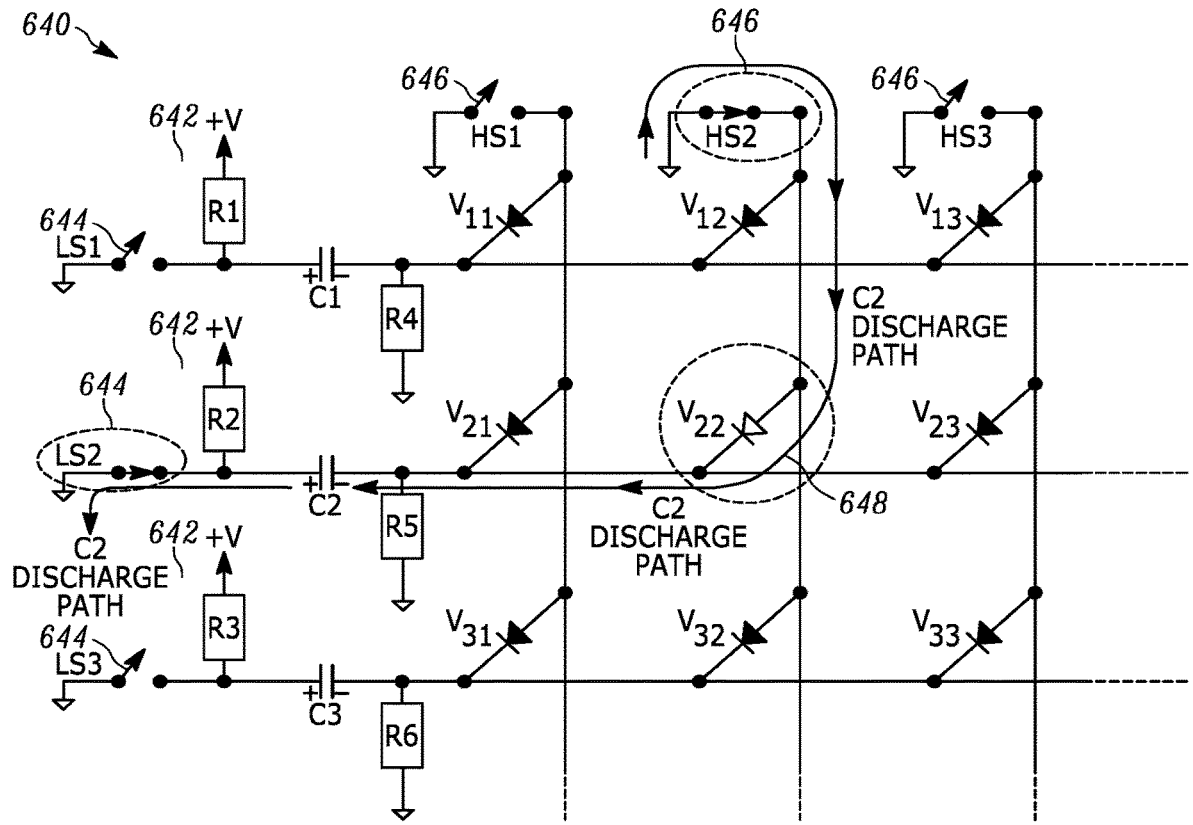
FIG. 5K illustrates an electrical schematic diagram of the matrix-addressable laser drive circuit described in connection with FIG. 5J, but configured with the low-side capacitive discharge circuit in the capacitor discharge mode for laser diode 2,2 (second row and second column) according to one embodiment of the present teaching.

FIG. 5K illustrates an electrical schematic diagram of the matrix-addressable laser drive circuit 640 described in connection with FIG. 5J, but configured with the low-side capacitive discharge circuit 642 in the capacitor discharge mode for laser diode 2,2 (second row and second column). In the capacitor discharge mode for laser diode 2, 2, both the high-side switch and the low-side switches are closed causing a discharge of electrical current in the path 648.

Figure 5L:
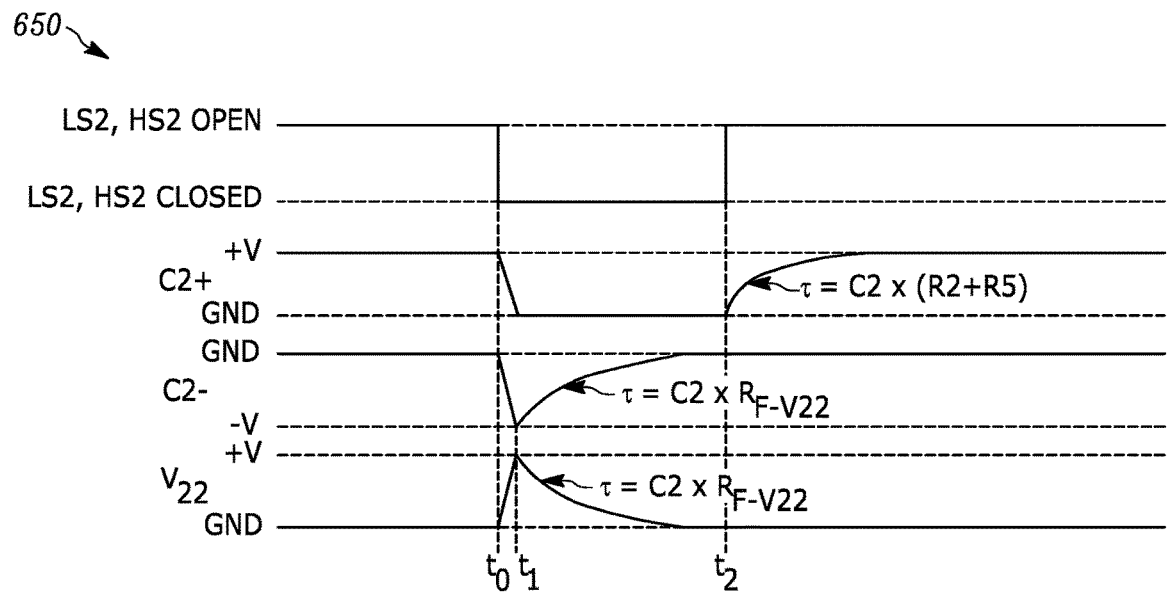
FIG. 5L illustrates a voltage potential timing diagram showing the voltage potential across capacitor $C_2$ and across the laser diode 2,2 in the second row and second column according to one embodiment of the present teaching.

FIG. 5L illustrates a voltage potential timing diagram 650 showing the voltage potential across capacitor $C_2$ and across the laser diode 2,2 in the second row and second column. The switches LS2 and HS2 are initially open. Before time to, when the switches LS2 and HS2 are open, the C2+ potential on capacitor C2 is at +V potential and C2− potential is at ground potential. At time to, the switches LS2 and HS2 are closed driving C2+ to ground and causing C2− to begin charging from ground to −V. At time $t_1$, the capacitor C2 begins to discharge with a time constant via laser diode 2,2 thereby causing the laser diode 2,2 to generate an optical pulse. At time $t_2$, the switches LS2 and HS2 are closed, thereby initiating conditions for the next pulse. The result of this switching sequence is also that the discharge control method generates an analog driving pulse where the power consumption is independent of the pulse width.

Figure 6:
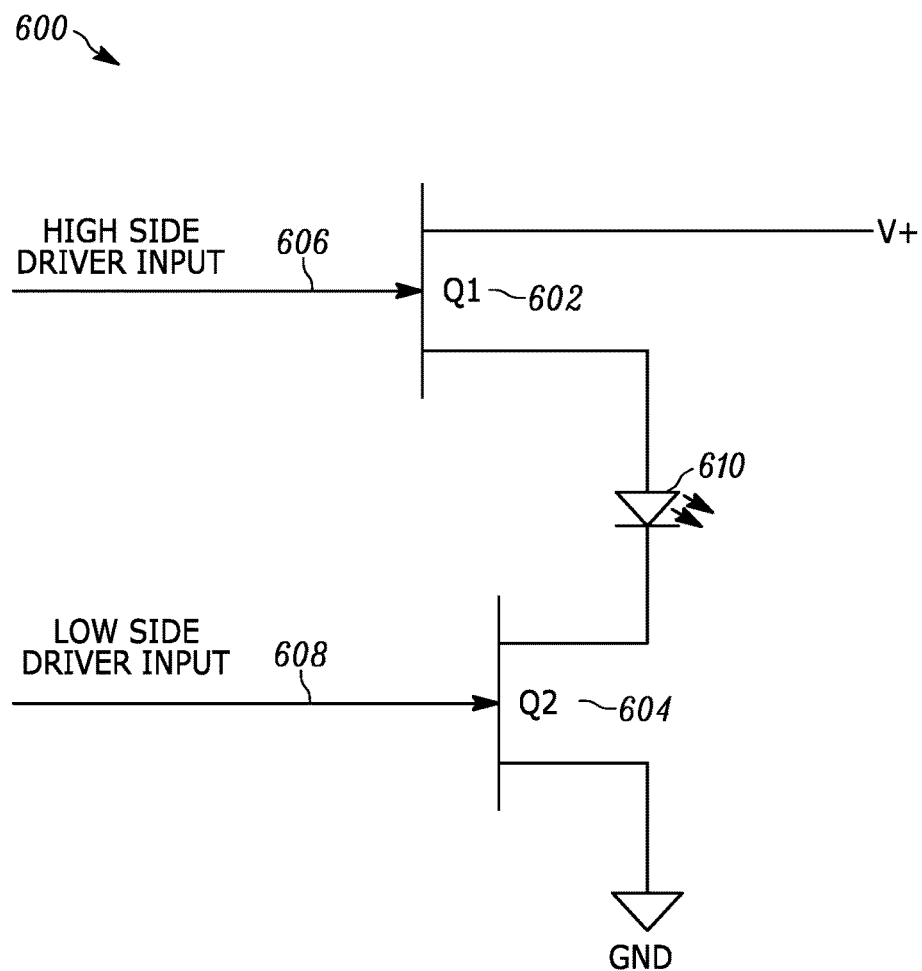
FIG. 6 illustrates an embodiment of a combined high-side and low-side GaN FET driver circuit for electrically driving a laser diode in a matrix-address laser drive circuit in a LIDAR system laser array according to the present teaching.

FIG. 6 illustrates an embodiment of a combined high-side and low-side GaN FET driver circuit 600 for electrically driving a laser diode in a matrix-address laser drive circuit in a LIDAR system laser array according to the present teaching. Such a driver circuit is also referred to in the art as an asymmetric on-off driver circuit. In various embodiments of the LIDAR system of the present teaching, the drive circuit 600 is connected to each of the column/row anode/cathode connections that are shown in FIGS. 5A-B where the drive circuit 600 is configured as an on-off driver that includes a high-side drive electrical input 602 and a low-side drive electrical input 604.

More specifically, referring to both FIG. 5B and FIG. 6, the cell 560 in the electrical schematic 500 is configured with the drive circuit 600 in the following way. A transistor 602, Q1, corresponds to the switch 556 that connects the voltage potential 550 to the laser anode 504. A transistor 604, Q2, corresponds to the switch 558 that connects the ground 552 to the laser cathode 506. A high-side driver input 606 is electrically connected to the gate of the transistor 602. A low-side driver input 608 is electrically connected to the gate of the transistor 604.

The asymmetric, on-off driver circuit 600 is suitable for injecting a well-controlled, short duration, high-bias-current pulse into the laser junction 610 to energize the laser and cause it to emit light. For a pulsed TOF LIDAR system, the ideal optical power output pulse should be in the few-nanoseconds duration range and should provide a high peak output power for that duration. In some embodiments, the asymmetric, on-off driver circuit 600 is configured and operated so that the peak output power from a laser is at or minimally below the eye safe limit.

Figure 7:
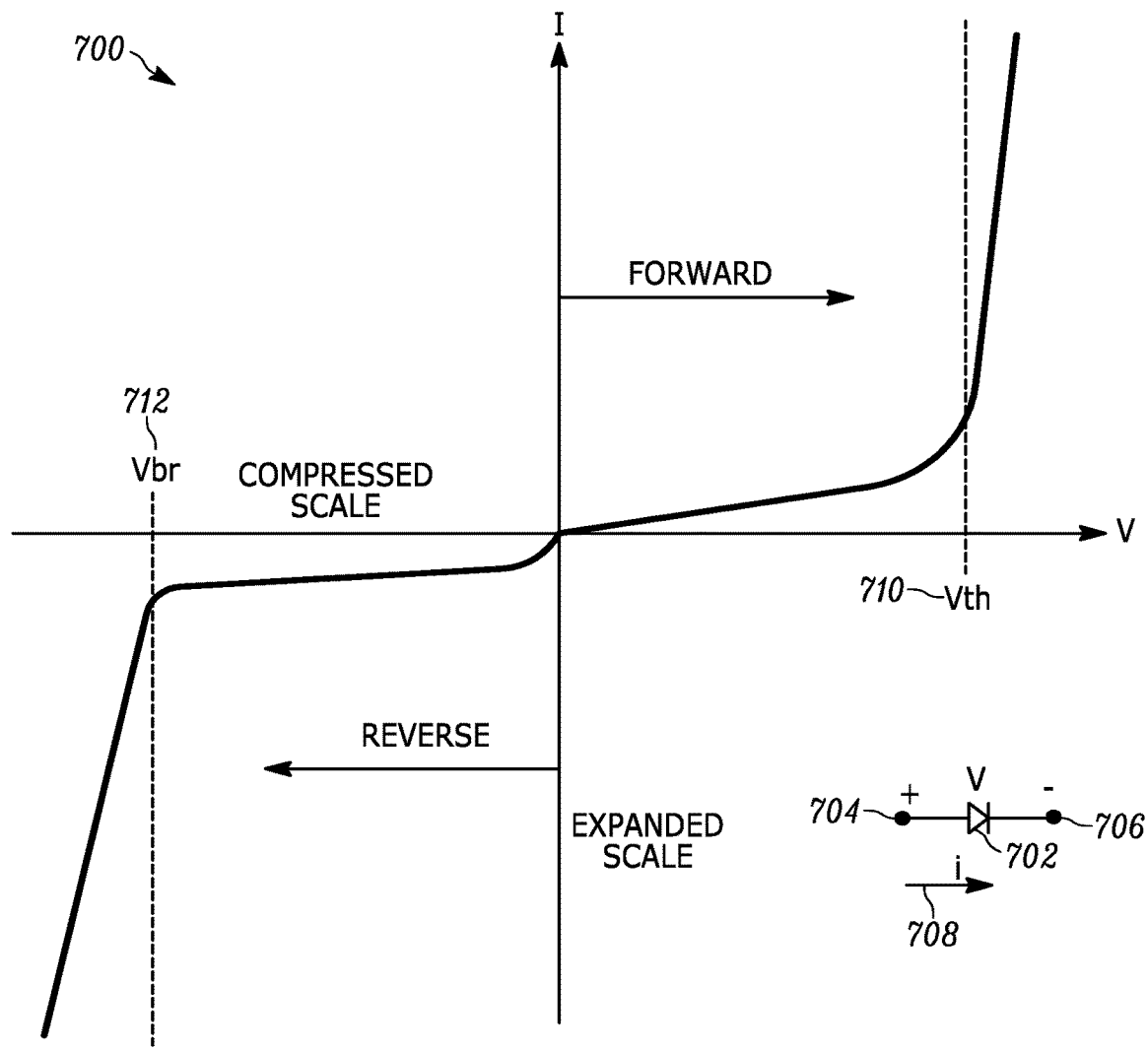
FIG. 7 illustrates a typical current-voltage curve for an embodiment of a semiconductor diode in a matrix-address laser drive circuit according to the present teaching.

One feature of the present teaching is that the array drive control circuit can be configured to optimize the drive based on the characteristics of a current-voltage (IV) curve of the laser emitters. FIG. 7 illustrates a typical current-voltage curve 700 for an embodiment of a semiconductor diode 702 in a matrix-address laser drive circuit according to the present teaching. The current-voltage curve graphically represents the relationship between the electrical current flowing through the VCSEL device and an applied voltage across the VCSEL device. As shown in FIG. 7, when the laser diode 702 is forward biased, the voltage at the anode 704 will be positive with respect to the cathode 706, and a forward or positive current 708 will flow through the diode 702. The current-voltage characteristics of the diode are non-linear and increase exponentially for positive current 708 from nominally zero, after the threshold voltage, $V^{th}$ 710 is exceeded.

When the laser diode is reversed biased where the voltage at the cathode is positive with respect to the anode, the laser diode blocks current flow except for an extremely small leakage current. The laser diode continues to block current flow until the reverse voltage across the diode becomes greater than its breakdown voltage ($V_{br}$ 712). Once breakdown is reached, the current will increase exponentially in the negative direction, and since the voltage and current are relatively high, the self-power dissipation is also relatively high, and the laser diode consequently will overheat and burn itself out. Light is generated from the laser in forward bias conditions.

The current-voltage behavior of each individual laser, combined with the method of controlling the laser drive to energize individual lasers, significantly affects the operating performance and reliability of the laser array. One feature of the matrix-addressable laser drive circuits of the present teaching is that they can be configured to minimize detrimental effects, such as optical cross-talk. Optical cross-talk occurs when other lasers in the array, other than the single laser which is being intentionally forward biased to energize, are forward biased at the same time because of current and or voltage leakage from the electrical drive supplied to the energized laser. As a result, the other lasers emit light, even though this emission is not desired. Such an optical cross-talk situation has a detrimental effect on the performance of the LIDAR system by virtue of illuminating measurement points that were not intended to be illuminated and/or illuminating a wider target area then intended.

Figure 8:
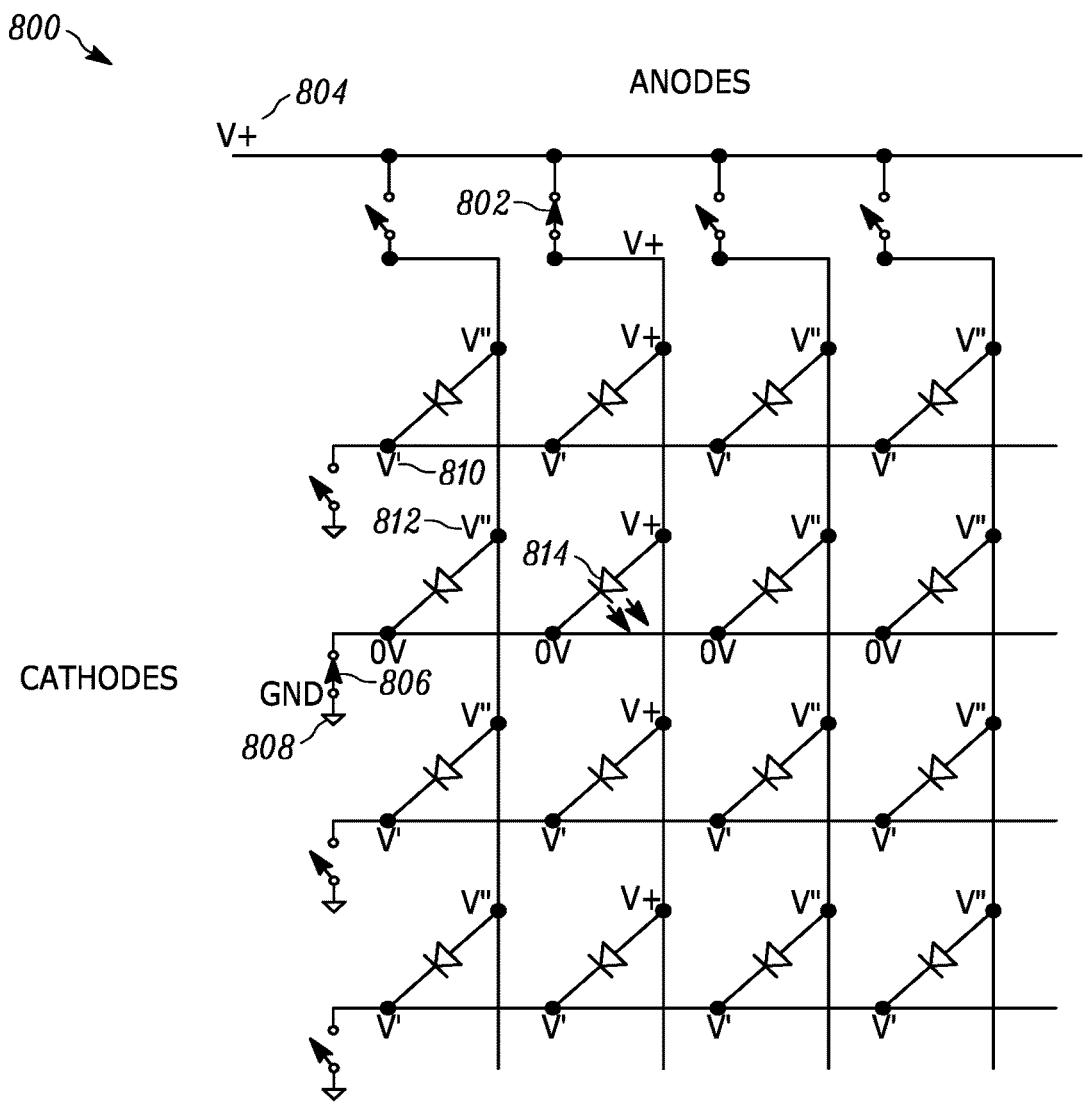
FIG. 8 illustrates the voltages induced at nodes in a matrix while energizing a single laser within a two-dimensional array with row/column matrix addressability according to an embodiment of a matrix-address laser drive circuit controller of the present teaching.

FIG. 8 illustrates the voltages induced at nodes in a matrix while energizing a single laser within a two-dimensional array with row/column matrix addressability according to an embodiment of a matrix-address laser drive circuit controller 800 of the present teaching. The matrix-addressable laser drive circuit controller 800 provides voltages at every node in the matrix similar to the operation of the embodiment described in connection with FIG. 5B. For example, the switch 802 connects the second column to the supply voltage 804 and the switch 806 connects the second row of lasers to ground 808. This switch configuration causes a voltage V' 810 to be induced at the anode of every row except for the row that is intentionally grounded by the connection of switch 806 to ground 808. The voltage V' 810 causes a voltage V'' 812 at the corresponding cathode of each laser in the array. The exact values of the voltages V' 810 and V" 812 are a function of V+ 804 as well as the actual current-voltage curve for the specific laser diode.

In the case in which the value of the supply voltage 804 is less than a reverse breakdown voltage of a laser pulse, the forward voltage drop of the laser, i.e. the absolute value of V+ is less than the sum of $V_{br}$ and $V_{th}$, there will be almost no reverse current flowing through the laser diodes. Such a condition improves device reliability. Also, if the voltage at a cathode is less than the threshold voltage, i.e. $V<V_{th}$, there will be almost no forward current flowing through the diodes on the same row as the active laser 814.

Figure 9:
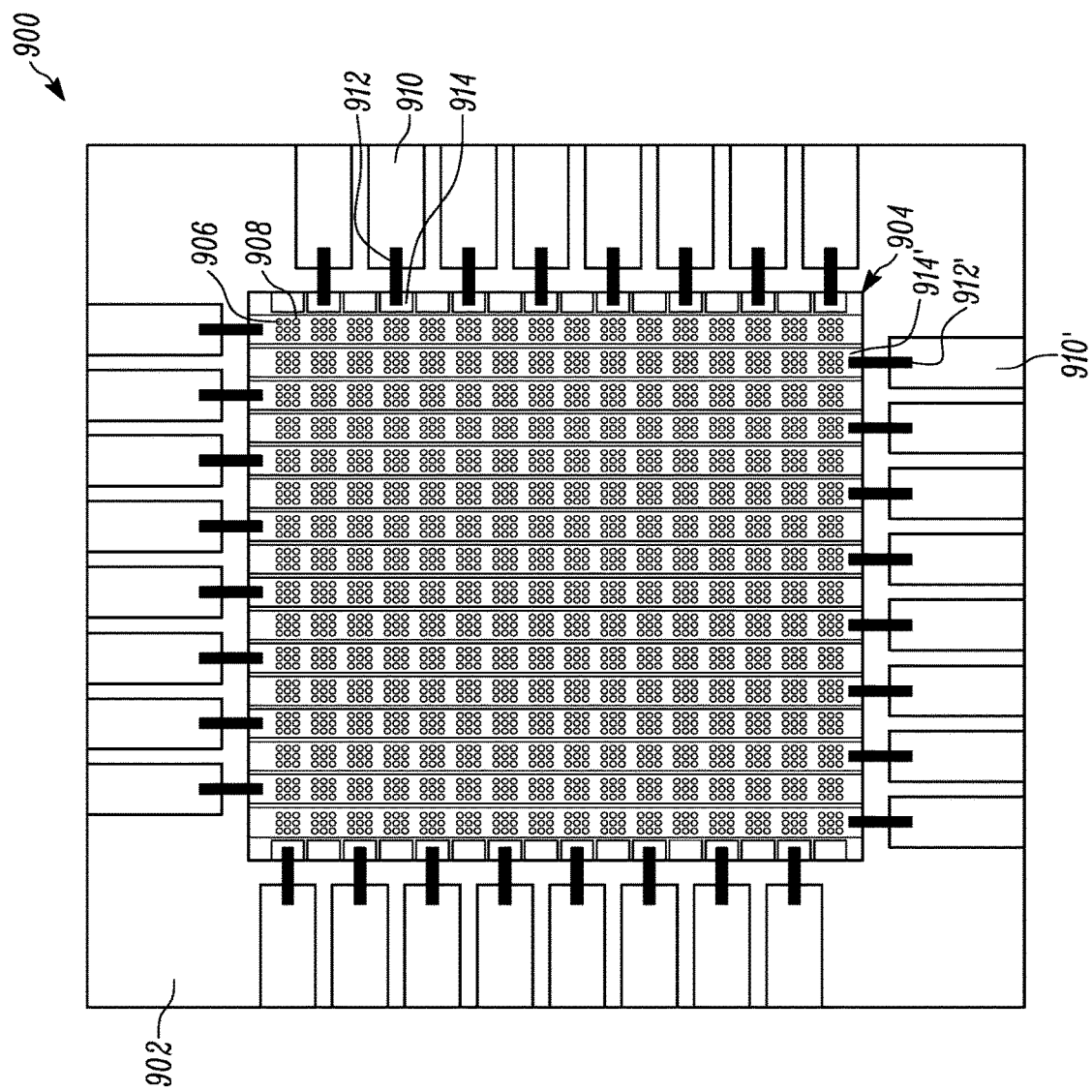
FIG. 9 illustrates an embodiment of a LIDAR system array according to the present teaching in which the physical connection to the array enables a denser layout for the associated electronic circuits on the printed circuit board (PCB).

FIG. 9 illustrates an embodiment of a LIDAR system mounted VCSEL array chip 900 on a carrier 902 according to the present teaching. The physical connection to the array enables a denser layout for the associated electronic circuits on a printed circuit board (PCB) substrate. A 16×16 array 904 of emitter clusters 906 comprising nine small apertures 908 of addressable VCSEL devices is shown. The carrier 902 has a number of electrical edge connectors 910, 910' that are each connected with a wire bond 912, 912' to a row edge 914 or a column edge 914' of the array 904. The connections to the anodes and cathodes alternate the sides of the electrical circuit on which the PCB is connected to the VCSEL. This alternating pattern of connections results in a wider pitch on the PCB between the row and column circuitry, which enables the GaN FET to be placed more closely to the VCSEL array resulting in a more compact layout for the electrical circuits, reducing the physical footprint.

As described previously, one aspect of the LIDAR system of the present teaching is the ability to individually energize each VCSEL located within a 2D matrix-addressable configuration in a laser array with a minimum number of required electrical drivers. When the array is driven in a matrix-addressable manner, by row/column, the minimum required number of drivers is equal to M+N where M is the number of columns and N is the number of rows, respectively. In contrast, if each VCSEL device within the array had its own dedicated driver, then the number of drivers would be much higher, equal to M×N. For example, a 16×16 element VCSEL array using matrix-addressing described herein requires only 32 drivers, compared to 256 drivers if each VCSEL had its own dedicated driver.

It is understood that with matrix addressing, completely independent operation of all lasers at the same time is not achievable. In other words, only certain lasers can be energized at a given time. However, this constraint is not significant for the LIDAR systems described herein, since in typical operation, only one laser within a specific monolithic array is energized at a time in order to have no ambiguity about which measurement point in space is being illuminated. Energizing one laser within a specific monolithic array at a time is also useful for maintaining Class1 Eye Safety.

It is further understood that matrix addressing is well known in the electronic art. However, the use of aspects of matrix addressing in LIDAR systems that require short duration, very-high-optical-power pulses, with low duty cycle was not previously known. A LIDAR system with 256 lasers as described, operating out to 100 m (1 μsec minimum time between pulses), would have a duty cycle of only 0.002% with a 5 nsec pulse duration. Matrix addressing has been used to energize optical communication laser devices which typically operate with relatively low peak power (mW compared to W) and relatively longer duration pulses, and duty cycle of ~50%. Under these conditions, the electrical drive requirements are very different from the operation of high-power lasers in a state-of-the art LIDAR application.

For example, pulsed TOF LIDAR system intended for greater than 100-m range operation using a 905-nm wavelength laser will typically require optical pulses with peak power in excess of 20 Watts and a pulse time duration of less than 10 nanoseconds. The corresponding drive voltage and current on the individual laser is in the 10's of Volts range, and the 10's of Amps range assuming the laser device has 1 W/A efficiency under pulsed conditions. Of course, with voltages greater than 10 V being applied to the matrix addressable array, there exists a significantly possibility of unwanted electrical and optical cross-talk. There is also a significant possibility that the VCSEL devices in the matrix can be damage or destroyed when reverse bias conditions exist with such voltages.

One of the primary factors affecting the reliability of the laser is the temperature of the device, both average and transient. If the pulse energy is controlled to keep the transient temperature rise of the device low enough, then the peak current and voltage values can be relatively high, as long as the duration of the pulse is short enough. Even in reverse bias conditions, where thermal runaway is an important concern, transient reverse current can be acceptable for reliability as long as the temperature rise in the vicinity of the junction is low enough. For example, assuming the material properties of GaAs for specific heat and density, a pulse of 1 μJ into a junction 2 microns thick, and 100 microns in diameter, would result in a temperature rise of ~9° C. for that junction. A 20V/10 A square pulse of 5 nsec in duration is equivalent to 1 μJ energy. The resulting transient temperature rise will be on the order of only a few degrees and thus will likely not be sufficient to degrade the reliability of the device.

Figure 10:
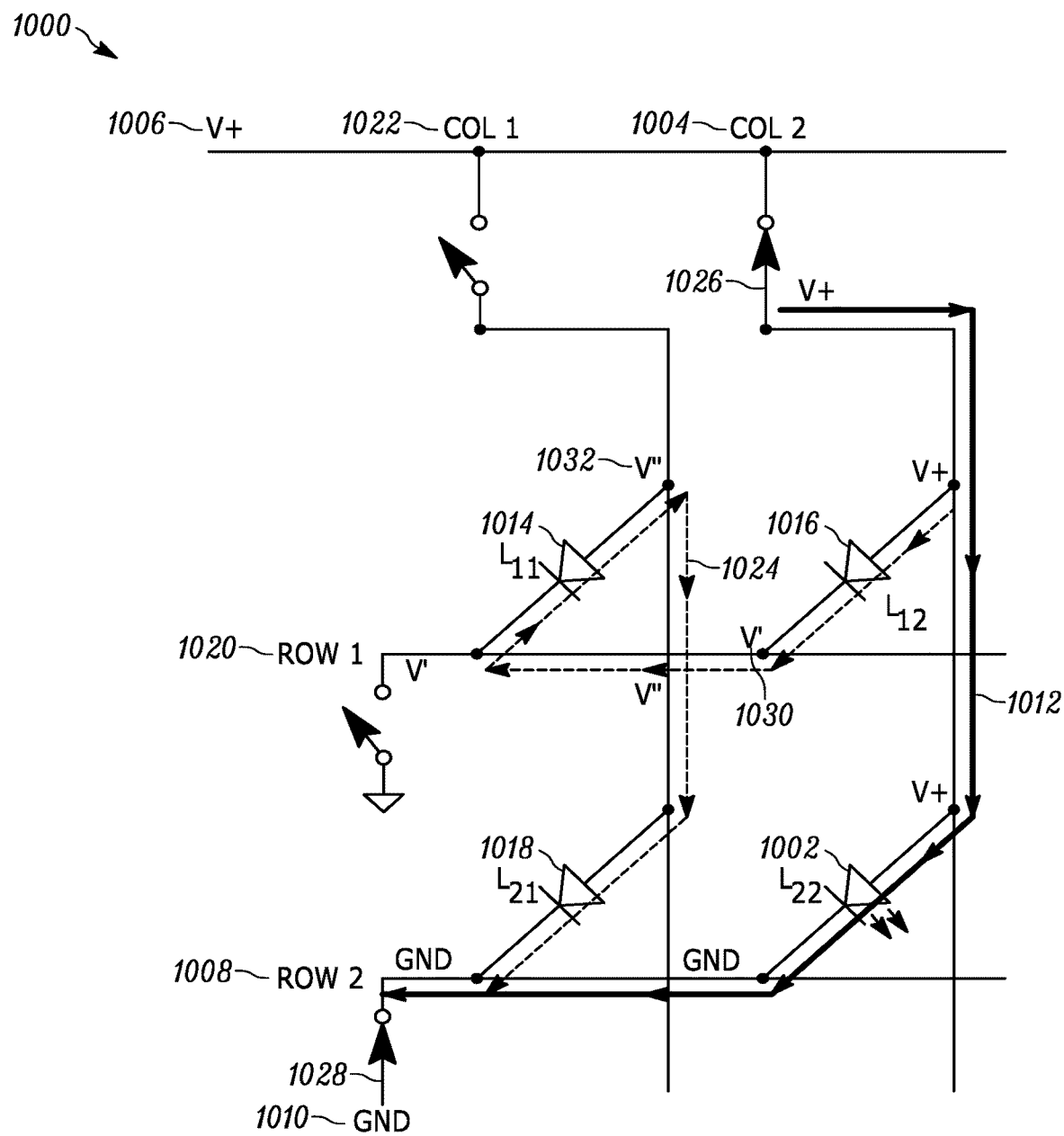
FIG. 10 illustrates a schematic diagram of an embodiment of a 2×2 laser array with a matrix-address laser drive circuit control circuit according to the present teaching that shows the possible electrical current paths when one laser is energized.

FIG. 10 illustrates a schematic diagram of an embodiment of a 2×2 laser array with a matrix drive control circuit 1000 according to the present teaching that shows the possible electrical current paths when one laser 1002 is energized. For simplicity, only a 2×2 matrix is shown in this diagram. It should be understood that the electrical behavior of the 2×2 matrix can be extended to a larger M×N matrix.

FIG. 10 is presented to illustrate the potential issues resulting from the high voltages necessary for state-of-the art LIDAR applications. In FIG. 10, the VCSEL device L22 1002 is intentionally forward biased and emitting light since Column 2 1004 is connected to drive voltage bus 1006, V+, and Row 2 1008 is connected to ground bus 1010. The current flow through VCSEL device L22 is indicated by the solid line 1012 with arrows in the diagram. Ideally, all other VCSEL devices 1014, 1016, 1018 in the matrix are turned off by virtue of Row 1 1020 and Column 1 1022 being open and not connected to either ground bus 1010 or V+ bus 1006.

However, there exists the possibility of a second current path besides the primary path of solid line 1012. This second current path is indicated by the dashed line 1024 with directional arrows. When V+ on bus 1006 is applied to Column 2 1004 by closing switches 1026, 1028, the VCSEL device 1016 L12 will have V+ on bus 1006 applied at the Anode, and the voltage denoted V' 1030 will be induced at the cathode in order to satisfy the condition that this path is nominally an open circuit, where no current can flow. Note that when voltage V+ on bus 1006 is initially applied to Column 2 1004, the voltage V' 1030 could initially be zero. When this occurs, there is a possibility of a transient current with enough forward voltage of VCSEL device L12 1016 and L22 1018 to cause it to emit undesired light which results in optical cross-talk. In this situation, the cross talk is additional undesired light produced within the field-of-view that is not light generated by VCSEL device L22 1002.

It follows as a result of the cathodes being connected in a given row, that voltage V' 1030 will also be applied to the cathode of VCSEL device L11 1014 and this will immediately put VCSEL device L11 1014 into a reverse bias condition. The voltage V'' 1032 will be induced at the anode of VCSEL device L11 1014 in order to satisfy current/voltage relationships. If the voltage V' 1030 is less than the reverse breakdown voltage of L11 1014, then the current flow is typically less than 1 µA. The small current flowing through L11 1014 will also flow through L21 1018 putting it in forward bias condition. Voltage V'' will correspond to the forward IV curve of L21 1018. To avoid light being emitted from L21, the current through L21 1018 should be lower than the laser threshold current, which could be expected to be in the range of 10 to 100 mA for the LIDAR application.

However, if the voltage V' 1030 is greater than the breakdown voltage of VCSEL device L11 1014, then a much higher current will flow through the circuit. If this current is above the threshold current for L21 1018 then light will be generated in both VCSEL device L12 1016 and VCSEL device L21 1018, which results in the generation of undesired optical cross-talk. Thus, it is understood that voltage V' 1030 cannot be arbitrarily large, but instead must be constrained in order that either it is always less than the reverse breakdown voltage of a VCSEL device or at least that the current flow through the corresponding path is not sufficient to cause light to emit from these two VCSEL devices, L12 1016 and L21 1018.

Thus, one aspect of the present teaching is the realization that it is desirable to constrain the voltage V' 1030 to be less than the reverse breakdown voltage for the particular VCSEL device that is used for LIDAR applications in order to avoid undesired optical cross-talk. In addition, sustained current flow under reverse bias conditions is undesirable because it can be a potential reliability issue for laser diodes depending on the time, energy associated with the current flow, and the resulting thermal rise in the laser diode among other factors.

Under operating conditions where voltage V' 1030 results in significant transient current flow through devices 1014, 1016, and 1018, the pulse energy should be low enough to not significantly impact the reliability, and the transient temperature rise in these devices should be less than 20° C.

Using many known VCSEL device structures for LIDAR applications will result in the generation of undesired optical cross-talk because voltages of 10V-80V are typically required to generate the high power optical pulses required for state-of-the-art LIDAR applications, while the reverse breakdown voltage for a typical VCSEL device with a single active region is in the range of 5V to 15V.

Thus, another aspect of LIDAR systems using the matrix-addressable control circuits according to the present teaching to drive laser arrays for LIDAR applications is the design of the VCSEL device itself to have desirable operating specifications that reduce or illuminate optical cross talk and while having high reliability. That is, VCSEL devices according to the present teaching are specifically designed such that the operating conditions prevent unwanted optical cross-talk from impacting system performance. One way of the preventing unwanted optical cross-talk is to fabricate the VCSEL devices with laser structures that can achieve relatively high reverse bias operating conditions without going into breakdown condition.

One possible laser structure that can increase $V_{th}$ or $V_{br}$, or both, includes multiple junctions in series within the VCSEL device. A laser structure with multiple junctions in series has been demonstrated in devices using tunnel junctions that separate the active junctions. It should be understood that numerous other similar laser structures with multiple junctions can be used. Although using multiple junctions will increase the $V_{th}$, since the pulse voltages and currents are high, the impact on efficiency and device performance is typically acceptable for this application.

Figure 11:
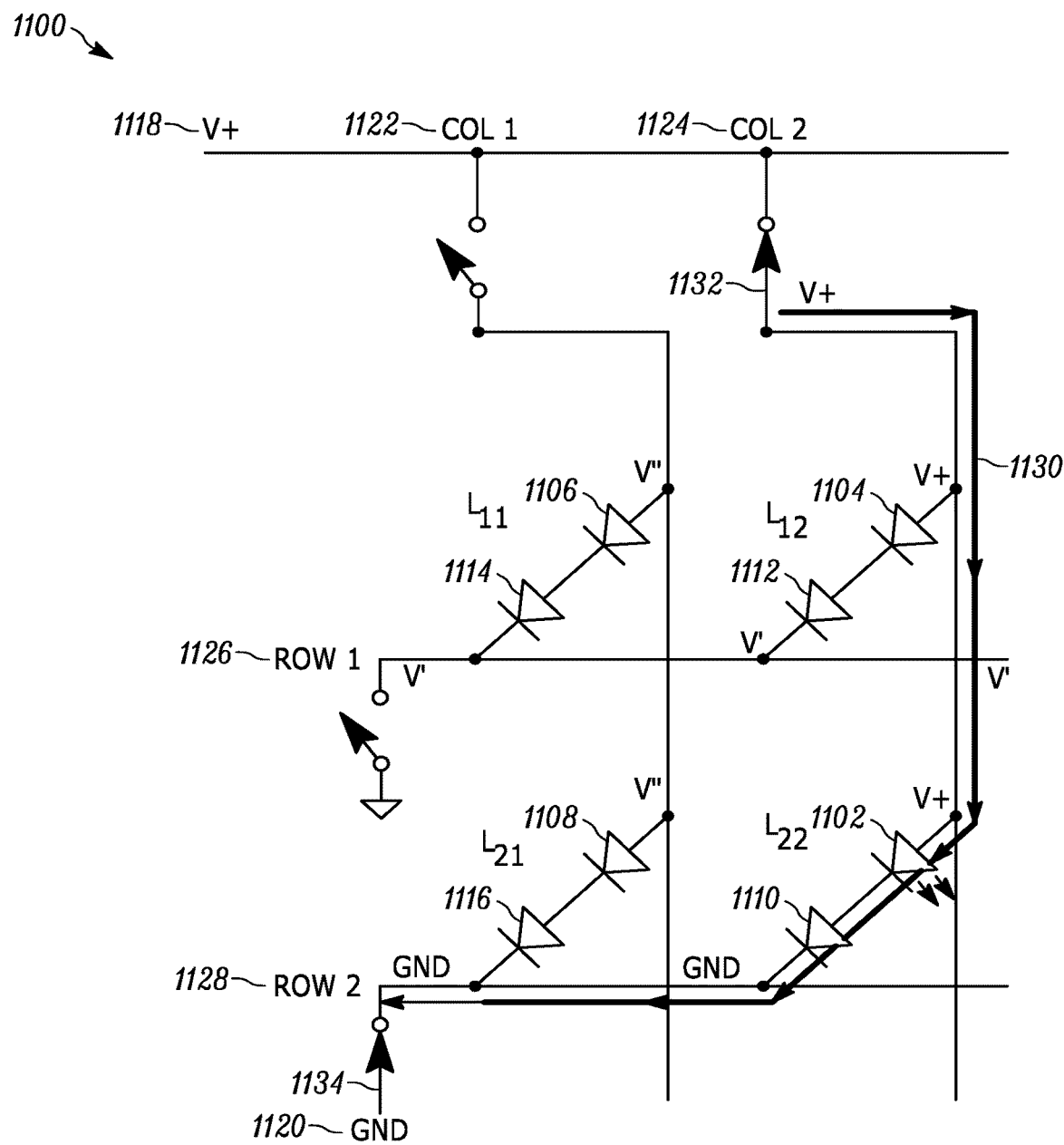
FIG. 11 illustrates a schematic diagram of an embodiment of a 2×2 laser array comprising lasers having a second diode in series with each laser diode in a matrix-address laser drive circuit according to the present teaching.

FIG. 11 illustrates a schematic diagram of an embodiment of a 2×2 laser array comprising lasers having a second diode in series with each laser diode in a matrix-address laser drive circuit 1100 according to the present teaching. Similar to the schematic diagram of the 2×2 laser array 1000 described in connection with FIG. 10, the laser array 1100 includes VCSEL devices 1102, 1104, 1106, 1108 in the matrix. In addition, the second diode devices 1110, 1112, 1114, 1116 are electrically connected in series with the laser diode 1102, 1104, 1106, 1108. In some embodiments, the VCSEL devices 1102, 1104, 1106, 1108 are GaAs laser diodes and the second diode devices 1110, 1112, 1114, 1116 are silicon diodes. Similar to the schematic diagram of the 2×2 laser array 1000 described in connection with FIG. 10, there is a drive voltage bus 1118, ground bus 1120, two columns 1122, 1124 and two rows 1126, 1128.

In operation, when the two switches 1132, 1134 are closed, a laser drive current flows through the path 1130 shown with a bold line in the direction indicated by the arrows. The second diodes 1110, 1112, 1114, 1116 will increase the forward voltage drop between the column and row anode and cathode connections. However, since the typical forward voltage drop of a GaAs laser diode is about 2V to 3V, and is about 1V to 2V for a silicon diode, the additional forward voltage drop is not significant since the matrix-address laser drive circuit 1100 is designed to generate high optical power from each laser so it typically operates at drive voltages in excess of 10V. As such, this additional forward voltage drop does not have a major impact on performance. In some embodiments, more than one additional diode is added in series with the laser diode.

Different embodiments use different diode types to implement the second diode 1110, 1112, 1114, 1116 connected in series, or multiple additional diodes connected in series. For example, some embodiments stack a second diode 1110, 1112, 1114, 1116 monolithically with the respective laser 1102, 1104, 1106, 1108 within a chip. The chip may be a GaAs chip, similar to that shown in FIG. 2, but with additional layer structures that form one or more series diode(s). In some embodiments, the stacked second diode is another active P-N junction that generates optical gain which beneficially increases the brightness of the VCSEL. In other embodiments, the stacked second diode is not optically active so it does not contribute the light generated. In some embodiments, the stacked second diode is a photodiode. In some embodiments, the implementation of a stacked structure utilizes a tunnel junction to separate the two stacked diodes in order to keep resistance of the overall structure relatively low.

VCSEL devices with stacked or cascaded multiple-diode regions are known in the art. See, for example, "Bipolar Cascade VCSEL with 130% Differential Quantum Efficiency", Annual Report 2000, Optoelectronics Department, University of ULM. Also, multi-diode cascade VCSEL structures have been used to increase overall brightness. See, for example, U.S. Patent Publication No. US2015/0311673A1. Also, VCSEL have been fabricated with integrated photodiodes. See, for example, U.S. Pat. No. 6,717,972. However, the prior art does not teach matrix-address laser drive circuit 1100 configured for LIDAR application using such structures.

Another VCSEL device structure according to the present teaching that achieves relatively high reverse bias operating conditions without going into breakdown condition serially connects two or more VCSEL devices in a single laser emitter configuration. This can be accomplished by appropriate routing of the anode and cathode connections in the chip fabrication process.

It is common in high-power VCSEL lasers to have more than one-emitter aperture connected in parallel within a single emitter. For example, the VCSEL array described in connection with FIG. 9 is a 16×16 array 904 comprising nine small apertures 908 of addressable top-emitting VCSEL devices where the individual apertures within each of the single emitter are connected in parallel. Series-connected VCSEL devices have been recently developed for high power application, but without regard to optical cross talk and forward voltage drop issues. See, for example, U.S. Patent Publication No. 2019/0036308 A1 that describes series-connected single chip VCSEL devices. Such devices can be configured to reduce optical cross talk according to the present teaching.

Figure 12:
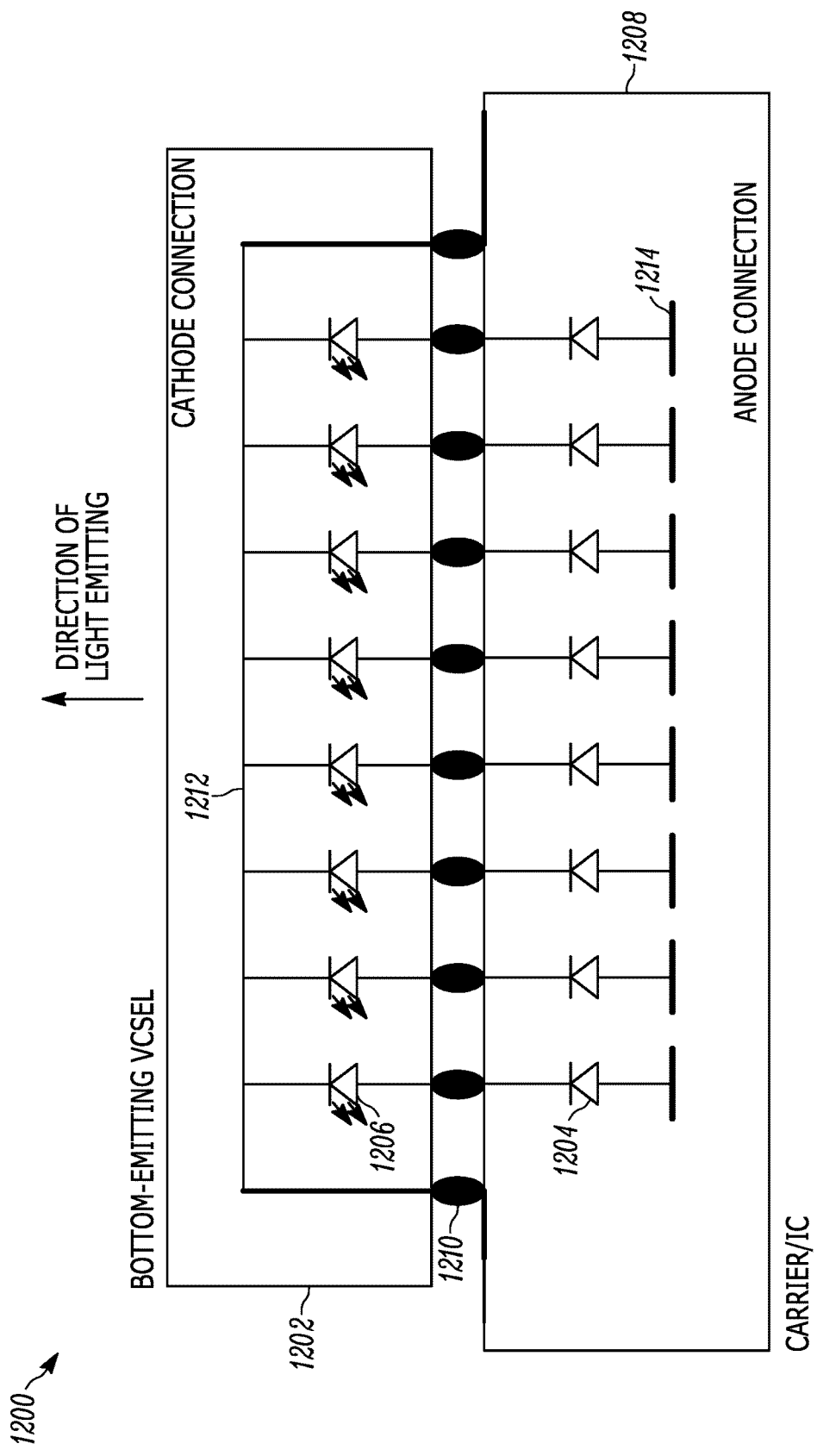
FIG. 12 illustrates an embodiment of multiple diodes in series comprising a VCSEL array with an additional diode connected in series with each laser diode that is part of a separate carrier according to the present teaching.

Another VCSEL device structure according to the present teaching that achieves relatively high reverse bias operating conditions without going into breakdown condition incorporates an additional diode into a companion substrate or IC that is bonded to the VCSEL device. FIG. 12 illustrates an embodiment of multiple diodes configured in series 1200 comprising a VCSEL array 1202 with an additional diode 1204 connected in series with each laser diode 1206 that is part of a separate carrier 1208 according to the present teaching. In some embodiments, the carrier 1208 is an integrated circuit. For example, the integrated circuit can be an inexpensive silicon based integrated circuit.

The carrier 1208 can be electrically connected to the array 1202 in various ways. For example, the carrier 1208 can be electrically bonded to the array 1202 using bump bond connectors 1210. In the configuration shown in FIG. 12, a bottom-emitting VCSEL laser array 1202 is bonded to a carrier. The diagram shows only a single row of VCSEL emitters which share a common cathode connection 1212 for simplicity. The anode connections 1214 run perpendicular to the plane shown in the diagram. Each VCSEL diode 1206 is paired with a diode 1204 on the carrier 1208. It should be understood that the additional diodes can be added in series in this and the other configurations described herein to further reduce the possibility of optical cross-talk. With some configurations, more than two diodes are connected serially to achieve the desired reverse voltages induced in the matrix to reduce or eliminate optical cross talk.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A solid state light detection and ranging (LIDAR) transmitter comprising:
    a) a two dimensional array of laser devices having columns and rows and configured such that anodes of laser devices in a column are connected to a common anode connection and cathodes of laser devices in a row are connected to a common cathode connection;
    b) a capacitive discharge circuit having an input configured to receive a voltage potential and having an output connected to the common anode connection, the capacitive discharge circuit comprising a first switch configured so the capacitive discharge circuit charges to the voltage potential when the first switch is open and discharges when the first switch is closed;
    c) a second switch electrically connected between the common cathode connection and ground, the second switch configured such that the common cathode connection is coupled to ground when the second switch is closed; and
    d) a controller configured to instruct the first switch and the second switch to close at a time $t_0$ such that the capacitive discharge circuit charges to the voltage potential at a time, $t_1$, thereby causing a laser device connected between the capacitive discharge circuit and the second switch to generate an optical pulse.

2. The solid state LIDAR transmitter of claim 1 wherein the two dimensional array of laser devices comprises a VCSEL array.

3. The solid state LIDAR transmitter of claim 1 wherein the laser devices comprise two or more serially-connected VCSEL devices.

4. The solid state LIDAR transmitter of claim 1 wherein the controller is further configured to instruct the first switch and the second switch to open at a time $t_2$, thereby initiating conditions for generating an additional optical pulse.

5. The solid state LIDAR transmitter of claim 1 wherein the capacitive discharge circuit is configured so that a time constant for charging to the voltage potential is different from a time constant of the discharge.

6. The solid state LIDAR transmitter of claim 1 wherein the capacitive discharge circuit is configured so that a time constant for charging to the voltage potential is less than a time constant of the discharge.

7. The solid state LIDAR transmitter of claim 1 wherein the laser drive circuit is configured so that a power consumption of the laser drive circuit is independent of a width of the generated optical pulse.

8. The solid state LIDAR transmitter of claim 1 wherein the capacitive discharge circuit is configured so that the voltage potential is greater than or equal to +10 Volts.

9. The solid state LIDAR transmitter of claim 1 wherein the laser drive circuit comprises a matrix addressable laser drive circuit.

10. A solid state light detection and ranging (LIDAR) transmitter comprising:
    a) a two dimensional array of laser devices having columns and rows and configured such that anodes of laser devices in a column are connected to a common anode connection and cathodes of laser devices in a row are connected to a common cathode connection;
    b) a capacitive discharge circuit having an input configured to receive a voltage potential and having an output connected to the common cathode connection, the capacitive discharge circuit comprising a first switch configured so the capacitive discharge circuit charges to the voltage potential when the first switch is open and discharges when the first switch is closed;
    c) a second switch electrically connected between the common anode connection and ground, the second switch configured such that the common anode connection is electrically connected to ground when the second switch is closed; and d) a controller configured to instruct the first switch and the second switch to close at a time $t_0$ such that the capacitive discharge circuit charges to the voltage potential at a time, $t_1$, thereby causing a laser device connected between the capacitive discharge circuit and the second switch to generate an optical pulse.

11. The solid state LIDAR transmitter of claim 10 wherein the two dimensional array of laser devices comprises a VCSEL array.

12. The solid state LIDAR transmitter of claim 10 wherein the laser devices comprise two or more serially-connected VCSEL devices.

13. The solid state LIDAR transmitter of claim 10 wherein the controller is further configured to instruct the first switch and the second switch to open at a time $t_2$, thereby initiating conditions for an additional optical pulse.

14. The solid state LIDAR transmitter of claim 10 wherein the capacitive discharge circuit is configured so that a time constant for charging to the voltage potential is different from a time constant of the discharge.

15. The solid state LIDAR transmitter of claim 10 wherein the capacitive discharge circuit is configured so that a time constant for charging to the voltage potential is less than a time constant of the discharging.

16. The solid state LIDAR transmitter of claim 10 wherein the laser drive circuit is configured so that a power consumption of the laser drive circuit is independent of a width of the generated optical pulse.

17. The solid state LIDAR transmitter of claim 10 wherein the capacitive discharge circuit is configured so that the voltage potential is less than or equal to −10V.

18. The solid state LIDAR transmitter of claim 10 wherein the laser drive circuit comprises a matrix addressable laser drive circuit.

* * * * *